United States Patent [19]

Kanazawa et al.

[11] Patent Number: 4,854,410
[45] Date of Patent: Aug. 8, 1989

[54] METHOD OF INCORPORATING FOUR-WHEEL STEERING SYSTEM IN VEHICLE AND FOUR-WHEEL STEERING SYSTEM

[75] Inventors: Hirotaka Kanazawa; Koushun Note; Yasuhiro Nakashima; Yoshiaki Mukai; Shunji Sakamoto; Shigeo Okamizu, all of Hiroshima, Japan

[73] Assignee: Mazda Motor Corporation, Hiroshima, Japan

[21] Appl. No.: 158,921

[22] Filed: Feb. 22, 1988

[30] Foreign Application Priority Data

Feb. 20, 1987 [JP] Japan .................... 62-37355
Feb. 23, 1987 [JP] Japan .................... 62-39769
Feb. 19, 1988 [JP] Japan .................... 63-37006

[51] Int. Cl.⁴ ......................................... B62D 9/00
[52] U.S. Cl. ............................ 180/140; 33/203.12; 180/142; 280/91
[58] Field of Search .................... 180/140, 142; 33/203.12, 203.13, 203.14, 203; 280/91

[56] References Cited

U.S. PATENT DOCUMENTS

| 3,596,730 | 8/1971 | Cecce ................ 180/140 X |
| 4,552,239 | 11/1985 | Kanazawa et al. ......... 180/140 |
| 4,601,357 | 7/1986 | Miyoshi et al. ........... 180/140 |
| 4,610,328 | 9/1986 | Kanazawa et al. ......... 180/140 |
| 4,621,702 | 11/1986 | Kanazawa et al. ......... 180/140 |

FOREIGN PATENT DOCUMENTS

| 60-166561 | 8/1985 | Japan . |
| 61-18568 | 1/1986 | Japan . |
| 61-108070 | 5/1986 | Japan . |
| 62-8869 | 1/1987 | Japan . |
| 62-8871 | 1/1987 | Japan . |
| 62-8872 | 1/1987 | Japan . |
| 62-12471 | 1/1987 | Japan . |
| 62-12472 | 1/1987 | Japan . |
| 62-18367 | 1/1987 | Japan . |

Primary Examiner—John A. Pekar
Attorney, Agent, or Firm—Gerald J. Ferguson, Jr.

[57] ABSTRACT

A four-wheel steering system has a front wheel turning mechanism for turning front wheels in response to operation of a steering wheel, a rear wheel turning mechanism for turning rear wheels, a controller for controlling the rear wheel turning mechanism to turn the rear wheels according to preset four-wheel steering characteristics and a relay shaft which is connected to the controller to transmit turning of the front wheels to the controller. The front wheel turning mechanism and the rear wheel turning mechanism are caused to bring the front wheels and the rear wheels to the respective straight-ahead positions while the relay shaft is disconnected from the controller. Then the controller is brought into the state corresponding to the straight-ahead positions of the front and rear wheels on the basis of the preset four-wheel steering characteristics. Thereafter, the relay shaft is connected to the controller.

31 Claims, 24 Drawing Sheets

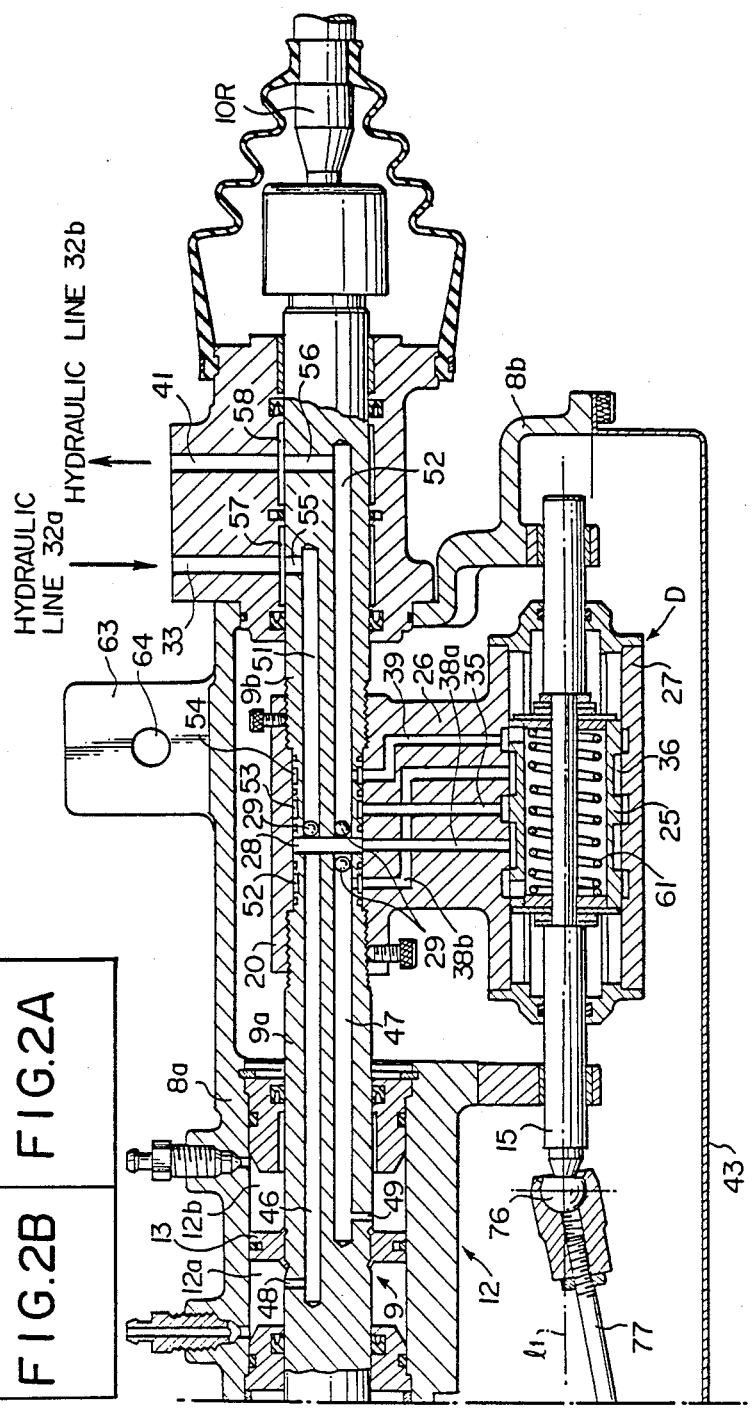

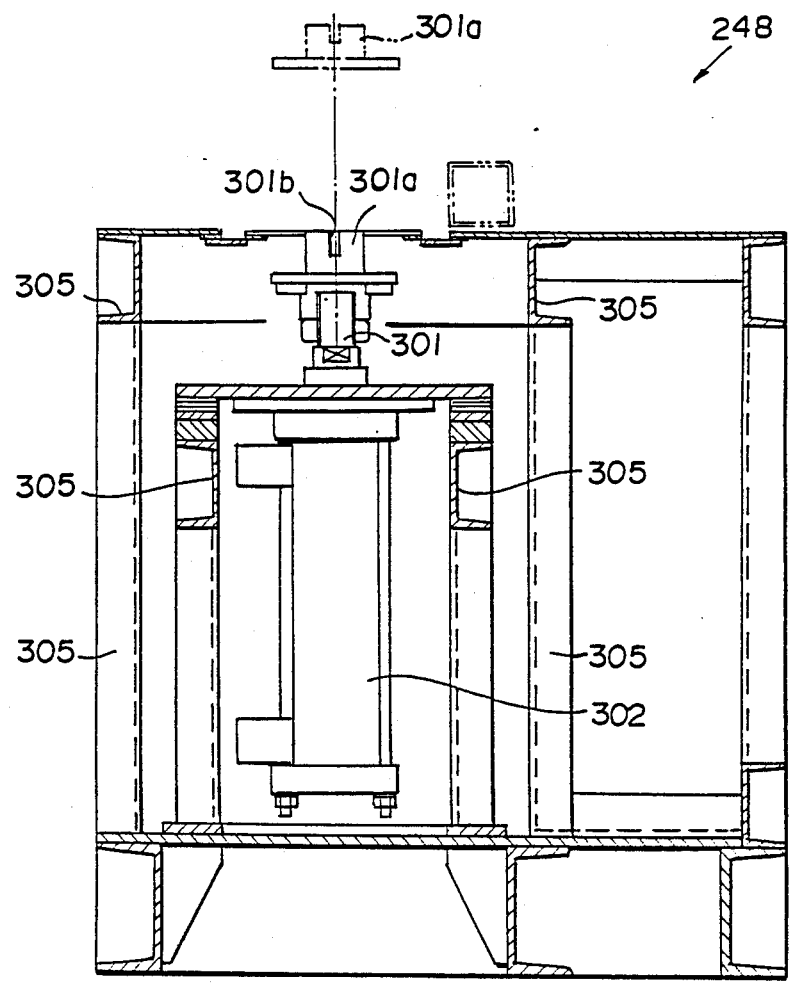

METHOD OF INCORPORATING FOUR-WHEEL STEERING SYSTEM IN VEHICLE AND FOUR-WHEEL STEERING SYSTEM

BACKGROUND OF THE INVENTION

1. Field of the Invention

This invention relates to a method of incorporating a four-wheel steering system in a vehicle, and a four-wheel steering system adapted to be incorporated in a vehicle by the method.

2. Description of the Prior Art

There has been proposed a four-wheel steering system in which both the front wheels and the rear wheels are turned in response to operation of the steering wheel. The four-wheel steering system is advantageous over the conventional two-wheel steering system in various aspects. For example, when the rear wheels are turned in the same direction as the front wheels (same phase) during high speed travel of the vehicle, the steering performance is improved to facilitate smooth lane changing since side force simultaneously acts on both the front and rear wheels. On the other hand, when the rear wheels are turned in the direction opposite to the turning direction of the front wheels (reverse phase) during low speed travel of the vehicle, the cornering performance is improved and the minimum turning radius of the vehicle is reduced.

The preferable rear wheel turning direction (the direction in which the rear wheels are turned for a given turning direction of the front wheels, that is, in the same direction, i.e., the same phase, or the reverse direction, i.e., the reverse phase) and the rear wheel turning angle ratio (the ratio of the turning angle of the rear wheels to the turning angle of the front wheels), vary depending on various factors such as the running conditions of the vehicle. (These characteristics are referred to as "the four-wheel steering characteristics", hereinbelow.) Accordingly, based on various concepts, there have been proposed various four-wheel steering systems in which the running condition of the vehicle is automatically detected and the four-wheel steering characteristics are automatically changed according to the running condition of the vehicle.

For example, it may be generally considered that the front wheels are not turned by a large angle when the vehicle runs at a high speed, and the time the front wheels are turned by a large angle is solely when the vehicle runs at a low speed. Accordingly, in one proposal, when the front wheel turning angle is relatively small, the rear wheels are turned in the same direction as the front wheels in order to, for instance, improve running stability, and when the front wheel turning angle is relatively large, the rear wheels are turned in the direction opposite to the front wheel turning direction in order to, for instance, improve cornering performance.

Further, the rear wheel turning mechanism may be mechanically connected to the front wheel turning mechanism so that the rear wheels are turned in response to operation of the steering wheel, or the rear wheel turning mechanism is electrically controlled so that the rear wheels are turned in response to operation of the steering wheel.

See, for example, U.S. Pat. Nos. 4,552,239, 4,601,357, 4,610,328 and 4,621,702, and Japanese Unexamined Patent Publication Nos. 61(1986)-108070, 61(1986)-8869, 62(1987)-8871, 62(1987)-8872, 62(1987)-12472, 62(1987)-18367, 62(1987)-12471 and 60(1985)-166561.

Since the rear wheels must be turned in response to turning of the front wheels according to predetermined fourwheel steering characteristics, the front wheel turning mechanism and the rear wheel turning mechanism must be adjusted with respect to each other when the four-wheel steering system is incorporated i a vehicle so that the rear wheels are actually turned according to the predetermined four-wheel steering characteristics, thereby making it difficult incorporation of the four-wheel steering system in the vehicle.

Further, since, in the four-wheel steering system, the front wheels and the rear wheels are operatively connected with each other, adjustment of toe-in of each of the front and rear wheels affect the toe of the other, thereby making it difficult incorporation of the four-wheel steering system in the vehicle.

SUMMARY OF THE INVENTION

In view of the foregoing observations and description, the primary object of the present invention is to provide a method of incorporating a four-wheel steering system in a vehicle in which the front wheel turning mechanism and the rear wheel turning mechanism can be correctly connected with each other so that the rear wheels can be actually turned according to predetermined four-wheel steering characteristics.

Another object of the present invention is to provide a method of incorporating a four-wheel steering system in a vehicle in which adjustment of toe-in of each of the front wheels and the rear wheels can be effected without interfering with adjustment of toe-in of the other.

Still another object of the present invention is to provide a four-wheel steering system adapted to carry out the method of the present invention.

In one aspect of the present invention, there is provided a method of incorporating in a vehicle a four-wheel steering system having a front wheel turning mechanism for turning front wheels in response to operation of a steering wheel, a rear wheel turning mechanism for turning rear wheels, a control means for controlling the rear wheel turning mechanism to turn the rear wheels according to preset four-wheel steering characteristics and a connecting means which is connected to the control means to transmit front wheel turning information to the control means, thereby operatively connecting the front wheel turning mechanism with the rear wheel turning mechanism, comprising steps of causing the front wheel turning mechanism and the rear wheel turning mechanism to bring the front wheels and the rear wheels to respective reference positions while the connecting means is operatively disconnected from the control means, bringing the control means into a reference state, and connecting the connecting means to the control means, the reference position of the front wheels and the reference position of the rear wheels corresponding to each other on the basis of the preset four-wheel steering characteristics, the reference state of the control means being a state corresponding to the reference positions of the front and rear wheels on the basis of the preset four-wheel steering characteristics.

In another aspect of the present invention, there is provided a four-wheel steering system characterized by having a locking means which prevent operation of the rear wheel turning mechanism.

BRIEF DESCRIPTION OF THE DRAWINGS

FIG. 10A is a fragmentary cross-sectional view taken along line XA—XA in FIG. 10, FIG. 17 is a cross-sectional view taken along line XVII—XVII in FIG. 7.

DESCRIPTION OF THE PREFERRED EMBODIMENTS

A four-wheel steering system in accordance with an embodiment of the present invention will be first described in detail with reference to FIGS. 1 to 8.

Figure 1:
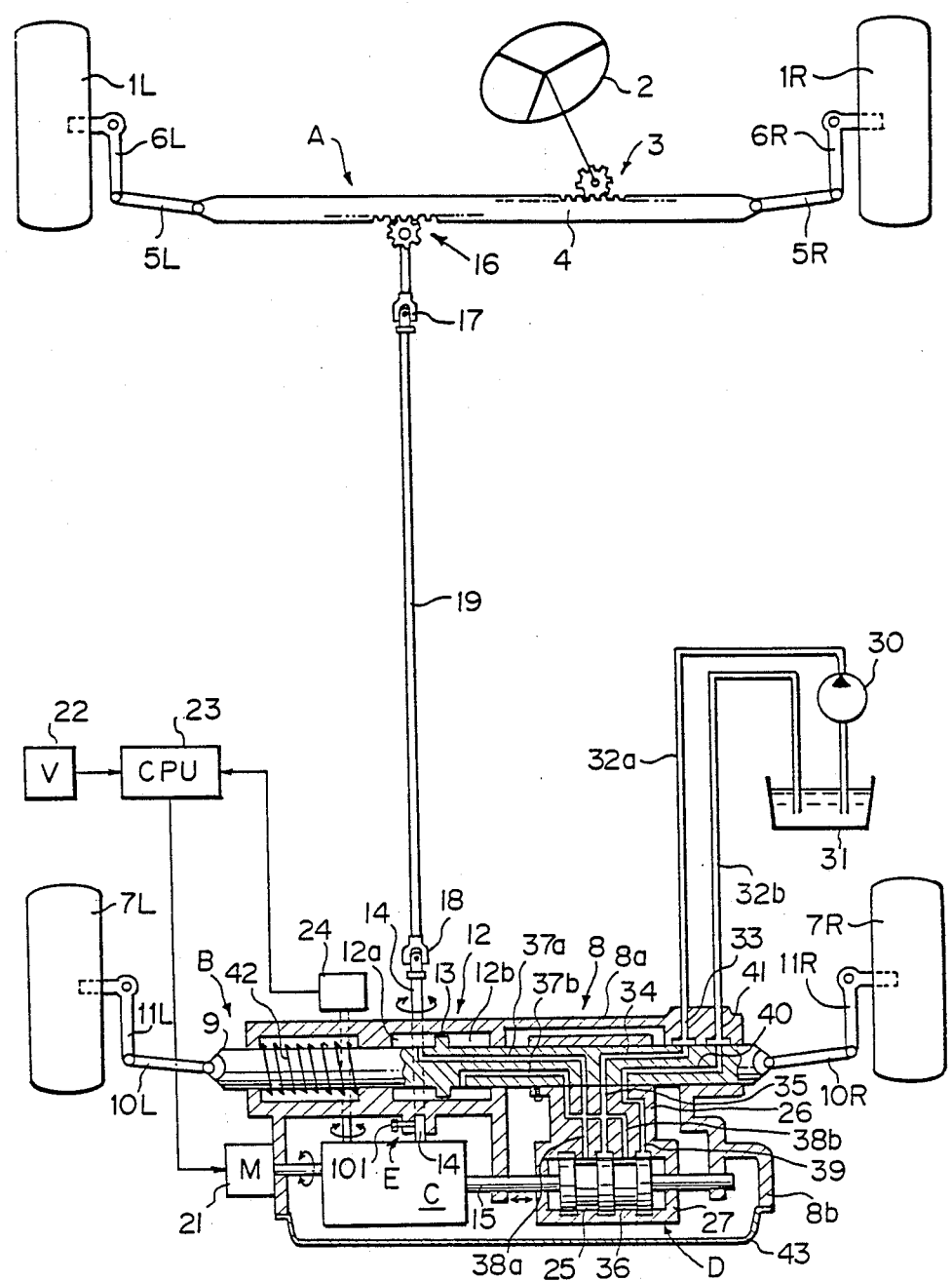
FIG. 1 is a plan view showing a four-wheel steering system in accordance with an embodiment of the present invention.

In FIG. 1, left and right front wheels 1L and 1R are turned by a front wheel turning mechanism A which, in this particular embodiment, comprises a steering wheel 2, a front wheel turning rod 4 provided with a rack-and-pinion mechanism 3 for moving the front wheel turning rod 4 in the transverse direction of the vehicle body in response to rotation of the steering wheel 2, tie rods 5L and 5R connected to the respective ends of the front wheel turning rod 4, and knuckle arms 6L and 6R respectively connected to the outer ends of the tie rods 5L and 5R.

Left and right rear wheels 7L and 7R are turned by a rear wheel turning mechanism B which, in this particular embodiment, comprises a rear wheel turning rod 9 which extends through a tubular casing 8a (formed as a part of a housing 8) in the transverse direction of the vehicle body and supported in the tubular casing 8a for sliding motion in the transverse direction of the vehicle body, tie rods 10L and 10R connected to the respective ends of the rear wheel turning rod 9, and knuckle arms 11L and 11R respectively connected to the outer ends of the tie rods 10L and 10R. When the rear wheel turning rod 9 is moved right or left from the straight-ahead position or the neutral position shown in FIG. 1, the the rear wheels 7L and 7R are turned. A pre-compressed return spring 42 is provided between the rear wheel turning rod 9 and the tubular casing 8a to urge the rear wheel turning rod in the neutral position. The rear wheel turning rod 9 is moved overcoming the force of the return spring 42 by a hydraulic actuator D formed integrally with the rear wheel turning rod 9. The hydraulic actuator D comprises a cylinder 12 through which the rear wheel turning rod 15 extends, hydraulic lines (to be described later) for supplying hydraulic pressure to the cylinder 12 and a spool valve 25 for controlling hydraulic pressure to the cylinder 12.

A piston 13 fixed to the rear wheel turning rod 9 is received in the cylinder 12 to define left and right hydraulic pressure chambers 12a and 12b in the cylinder 12.

The hydraulic actuator D displaces the rear wheel turning rod 9 in the transverse direction of the vehicle body under the control of a rear wheel turning angle ratio changing mechanism C in order to turn the rear wheels 7L and 7R by an amount corresponding to the amount by which the front wheels 1L and 1R are turned. The rear wheel turning angle ratio changing mechanism C has an input shaft 14 and a control rod 15 as an output shaft. The input shaft 14 is operatively connected with the front wheel turning rod 4 by way of a second rack-and-pinion mechanism 16, a universal joint 17, a relay shaft 19 and another universal joint 18 so that sliding movement of the front wheel turning rod 4 in the transverse direction of the vehicle body is transmitted to the input shaft 14 as a revolution. The output shaft of the rear wheel turning angle ratio changing mechanism C, that is, the control rod 15 is arranged to be moved in parallel to the rear wheel turning rod 9. The rear wheel turning angle ratio changing mechanism C is connected to a pulse motor 21 for changing the rear wheel turning angle ratio (the ratio of the turning angle of the rear wheels $\theta_R$ to the turning angle of the front wheels $\theta_F$) according to the vehicle speed. The amount of rotation and the direction of rotation of the pulse motor 21 is controlled by a controller 23 according to the vehicle speed. Reference numeral 22 denotes a vehicle speed sensor. Reference numeral 24 denotes a rear wheel turning angle ratio sensor, and the output of the rear wheel turning angle ratio sensor 24 is input into the controller 23 for feedback control of the pulse motor 21.

The rear wheel turning angle ratio changing mechanism C is housed in a casing 8b integrally formed with the tubular casing 8a, and the control rod 15 is connected to the spool valve 25 of the hydraulic actuator D. The spool valve 25 is slidably received in a valve housing 27 fixed to the rear wheel turning rod 9 by way of a connecting portion 26. The spool valve 25 is in alignment with the control rod 15 and is movable in parallel to the rear wheel turning rod 9. A plurality of hydraulic lines are formed in the housing 8, the rear wheel turning rod 9 and the connecting portion 26 in the following manner in order to supply hydraulic oil into the valve housing 27 and the hydraulic pressure chambers 12a and 12b of the cylinder 12. That is, hydraulic oil in an oil reservoir 31 fed by an oil pump 30 is introduced by way of a hydraulic line 32a into a hydraulic line 33 formed in the housing 8 and into a hydraulic chamber 36 formed in the valve housing 27 by way of a hydraulic lines 34 and 35 respectively formed in the rear wheel turning rod 9 and the connecting portion 26. The hydraulic pressure chamber 12a is communicated with the hydraulic chamber 36 of the valve housing 27 by way of hydraulic lines 37a and 38a respectively formed in the rear wheel turning rod 9 and the connecting portion 26, and the hydraulic pressure chamber 12b is communicated with the hydraulic chamber 36 of the valve housing 27 by way of hydraulic lines 37b and 38b respectively formed in the rear wheel turning rod 9 and the connecting portion 26. Hydraulic oil in the hydraulic chamber 36 returns to the oil reservoir 31 by way of a hydraulic line 39 formed in the connecting portion 26, a hydraulic line 40 formed in the rear wheel turning rod 9, a hydraulic line 41 formed in the casing 8a and a hydraulic line 32b. With this arrangement, the rear wheel turning rod 9 is moved left and right in response to left and right movement of the control rod 15. An oil pan 43 is mounted on the lower end of the casing 8b in which the rear turning angle ratio changing mechanism C and the valve housing 27 of the hydraulic actuator D are accommodated The oil pan 43 is filled with oil for lubrication of the mechanical parts.

As shown in more detail in FIG. 2A, the rear wheel turning rod 9 is formed of left and right rod halves 9a and 9b in order to facilitate formation of the hydraulic lines described above. The left and right rod halves 9a and 9b are connected together by way of a tubular body 20 in which the rod halves 9a and 9b are screwed from opposite sides. In the tubular body 20, the left and right rod halves 9a and 9b are opposed to each other at a predetermined distance from each other, whereby a chamber 28 is defined by the end surfaces of the rod halves 9a and 9b and the inner surface of the tubular body 20. An O-ring is fitted on the inner end portion of each of the rod halves 9a and 9b.

A pair of passages 46 and 47 for forming a part of the hydraulic lines 37a and 37b are formed in the left rod half 9a to extend in the longitudinal direction thereof from the end facing the chamber 28. The passages 46 and 47 are respectively communicated with the hydraulic pressure chambers 12a and 12b by way of transverse holes 48 and 49. The passage 46 communicated with the hydraulic pressure chamber 12a opens to the chamber 28 but the end of the passage 47 facing the chamber 28 is closed by a spherical plug 29. A pair of passages 51 and 52 for forming a part of the hydraulic lines 34 and 40 are formed in the right rod half 9b to extend in the longitudinal direction thereof from the end facing the chamber 28. The ends of the passages 51 and 52 facing the chamber 28 are both closed by a spherical plug 29.

The hydraulic lines 38b, 38a, 35 and 39 which are communicated with the hydraulic chamber 36 of the valve housing 27 through the connecting portion 26 open in the inner peripheral surface of the tubular body 20 in this order from left to right in FIG. 2A. The hydraulic line 38a opens to the chamber 28, whereby the hydraulic pressure chamber 12a is communicated with the hydraulic chamber 36 of the valve housing 27 by way of the hydraulic line 38a and the hydraulic line 37a formed of the transverse hole 48, the passage 46 and the chamber 28. An annular chamber 52 is defined on the peripheral surface of the left rod half 9a at a portion opposed to the open end of the hydraulic line 38b by forming thereon an annular groove. The annular chamber 52 is communicated with the passage 47 by way of a transverse hole formed in the left rod half 9a, whereby the hydraulic pressure chamber 12b is communicated with the hydraulic chamber 36 of the valve housing 27 by way of the hydraulic line 38b and the hydraulic line 37b formed of the transverse hole 49, the passage 47 and the annular chamber 52. A pair of annular chambers 53 and 54 are formed on the peripheral surface of the right rod half 9b at portions respectively opposed to the open ends of the hydraulic passages 35 and 39. The annular chambers 53 and 54 are respectively communicated with the passages 51 and 52 by way of transverse holes formed in the right rod half 9b. The passages 51 and 52 are communicated with the outer peripheral surface of the right rod half 9b respectively by way of transverse holes 55 and 56 which are formed in the right rod half 9b to respectively open to the passages 51 and 52 at the right hand end portion of the respective passages. The inner ends 57 and 58 of the hydraulic lines 33 and 41 formed in the tubular casing 8a at which the hydraulic lines 33 and 41 respectively join with the transverse holes 55 and 56 are extended in the longitudinal direction of the right rod half 9b so that the hydraulic lines 33 and 41 in the tubular casing 8a are kept in communication with the passages 51 and 52 even if the rear wheel turning rod 9 is slid left and right relative to the casing 8a. With this arrangement, the hydraulic line 32a extending from the oil pump 30 is communicated with the hydraulic chamber 36 in the valve housing 27 by way of the hydraulic line 33, the hydraulic line 34 formed of the transverse hole 55, the passage 51 and the annular chamber 53, and the hydraulic line 35, and the hydraulic chamber 36 is communicated with the oil reservoir 31 by way of the hydraulic line 39, the hydraulic line 40 formed of the annular chamber 54, the passage 52 and the transverse hole 56, the hydraulic line 41 and the hydraulic line 32b.

The hydraulic actuator D formed of the valve housing 27, the hydraulic chamber 36 and the spool valve 25 are substantially the same in structure and operation as the known hydraulic actuator for a power steering system, and accordingly, will not be described in more detail here. In the case of this embodiment, the spool valve 25 is in the form of a cylinder, and a return spring 61 is provided in the valve housing 27 to urge the spool valve 25 to a neutral position relative to the valve housing 27 even if the valve housing 27 is moved together with the rear wheel turning rod 9.

Figure 2B:
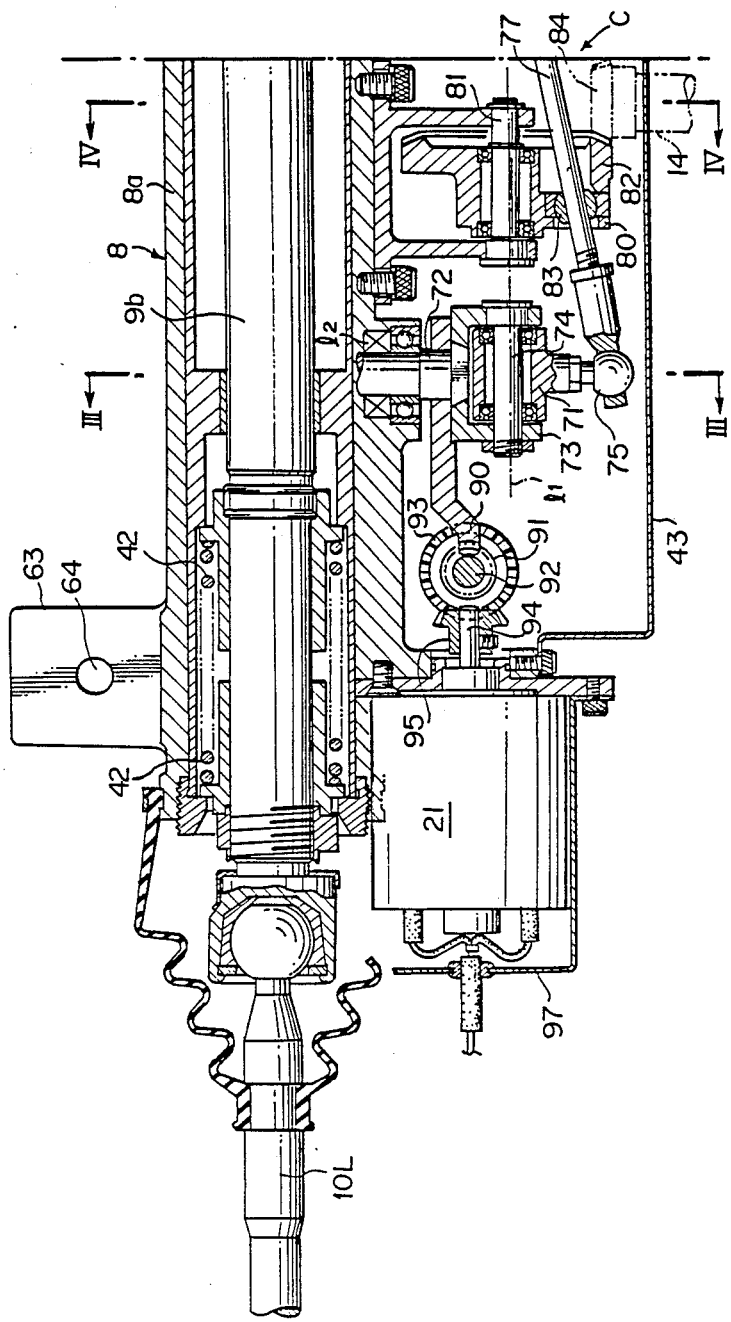
FIG. 2 is a cross-sectional view showing the rear wheel turning mechanism and the rear wheel turning angle ratio changing mechanism employed in the four-wheel steering system of FIG. 1, FIGS. 3 and 4 are cross-sectional views respectively taken along lines III—III and IV—IV in FIG. 2.
Figure 3:
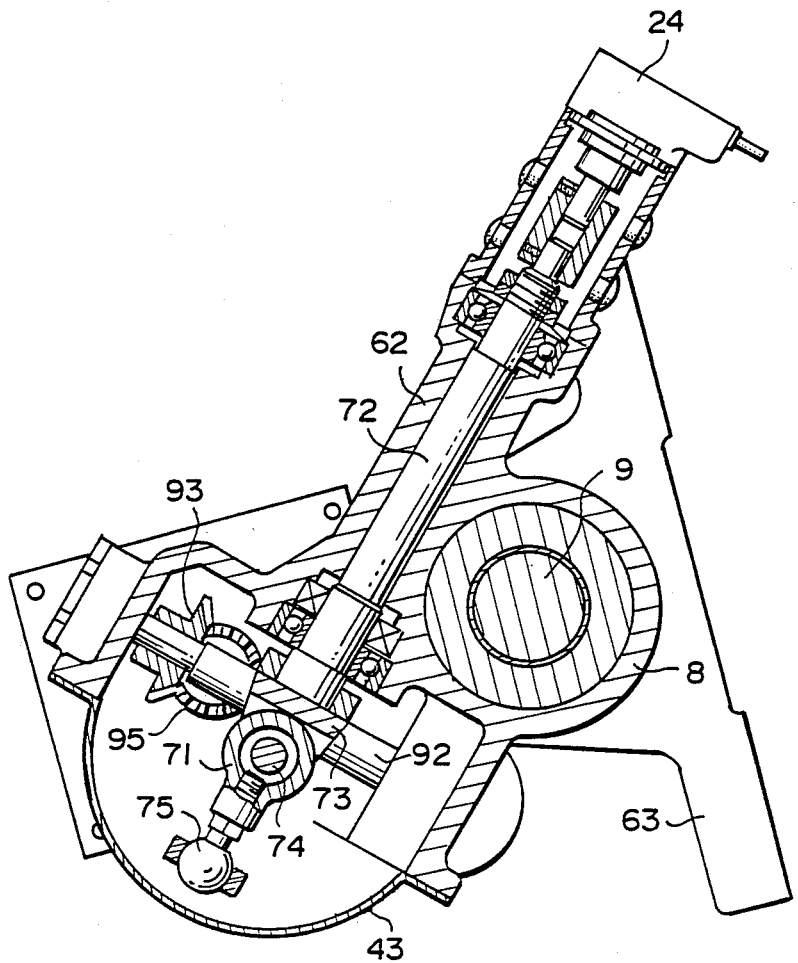

In FIG. 2B, the control rod 15 or the output shaft of the rear wheel turning angle ratio changing mechanism C is connected to the spool valve 25 and is supported for sliding movement in the transverse direction of the vehicle body along a line $l_1$. The rear wheel turning angle ratio changing mechanism C includes a U-shaped holder 73 connected to a support shaft 72 which is supported by the housing 8 for rotation about line $l_2$ perpendicular to line $l_1$ along which the control 15 is moved. A pivoted arm 71 is mounted on the holder 73 by a pin 74. The pin 74 of the pivoted arm 71 extends perpendicular to the line $l_2$ at the intersection of the lines $l_1$ and $l_2$, and when the holder 73 is rotated about the line $l_2$, an inclination angle between the pin 74 and the line $l_1$, that is, the angle between the plane along which the pivoted arm 71 is moved when swung about the pin 74 and a plane perpendicular to the line $l_1$ (This plane will be referred to as "the reference plane", hereinbelow.) is changed.

A connecting rod 77 is connected to the free end of the pivoted arm 71 by way of a ball joint 75 at one end and to the control rod 15 by way of a ball joint 76 at the other end so that the control rod 15 is moved along the line $l_1$ left and right as seen FIG. 2B when the pivoted arm 71 is swung and the free end of the pivoted arm 71 is moved left and right. The length of the connecting rod 77 is adjustable.

A swinging member 80 is connected to the connecting rod 77 by way of a ball joint 83 at a portion near the ball joint 75. The swinging member 80 comprises a bevel gear 82 having a large diameter and supported for rotation by a support shaft 81 extending along the line 11. The bevel gear 82 is in mesh with a bevel gear 84 on the end of the input shaft 14 (which is rotated by an amount corresponding to the turning angle of the steering wheel 2 as can be seen from FIG. 1) to transmit rotation of the steering wheel 2 to the swinging member 80.

Accordingly, the swinging member 80 and the connecting rod 77 are swung about the line $l_1$ by an amount corresponding to the turning angle of the steering wheel 2, thereby swinging the pivoted arm 71 about the pin 74. When the axis of the pin 74 is aligned with the line $l_1$, the ball joint 75 on the free end of the pivoted arm 71 is moved in the reference plane perpendicular to the line 11, and accordingly, the swinging movement of the pivoted arm 71 exerts no force on the control rod 15. On the other hand, when the axis of the pin 74 is inclined with respect to the line $l_1$, the ball joint 75 on the free end of the pivoted arm 71 is swung in a plane inclined with respect to the reference plane and a force pulling or pushing the control rod 15 or the spool valve 25 is exerted thereon by way of the connecting rod 77 upon operation of the steering wheel 2. That is, the amount of movement of the spool valve 25 for a given swinging angle of the pivoted arm 71 changes depending upon the inclination of the pin 74, i.e., the angular position of the holder 73.

Figure 5:
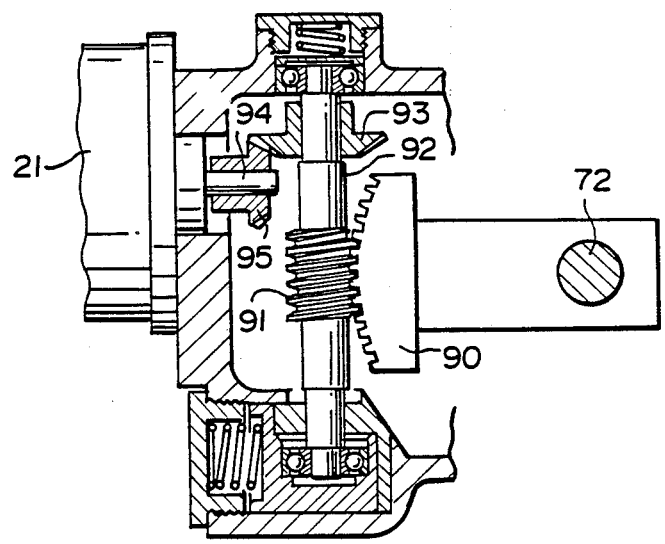
FIG. 5 is a fragmentary cross-sectional view showing a part of the rear wheel turning angle ratio changing mechanism.

A sector gear 90 is mounted on the support shaft 72 of the holder 73 as clearly shown in FIG. 5. A worm gear 91 formed on a shaft 92 is in mesh with the sector gear 90, and a bevel gear 93 is mounted on the shaft 92. The bevel gear 93 is in mesh with a bevel gear 95 mounted on the output shaft 94 of the pulse motor 21. By energizing the pulse motor 21 to rotate the sector gear 90, thereby changing the inclination angle of the holder 73 to the reference plane, the turning angle of the rear wheels 7L and 7R, i.e., the rear wheel turning angle ratio and the turning phase, is controlled. The pulse motor 21 is mounted on the left side end of the housing at a corner space between the tubular casing 8a and the casing 8b, and the output shaft 94 of the pulse motor 21 extends in parallel to the line 11. The support shaft 72 of the holder 73 extends into a tubular body 62 projecting upward integrally from the housing 8, and a rear wheel turning angle ratio sensor 24 for detecting the rear wheel turning angle ratio by way of the angular position of the support shaft 72, i.e., the holder 73, is mounted on the upper end of the support shaft 72. The rear wheel turning angle ratio sensor 24 may be of a potentiometer, for example.

Figure 6:
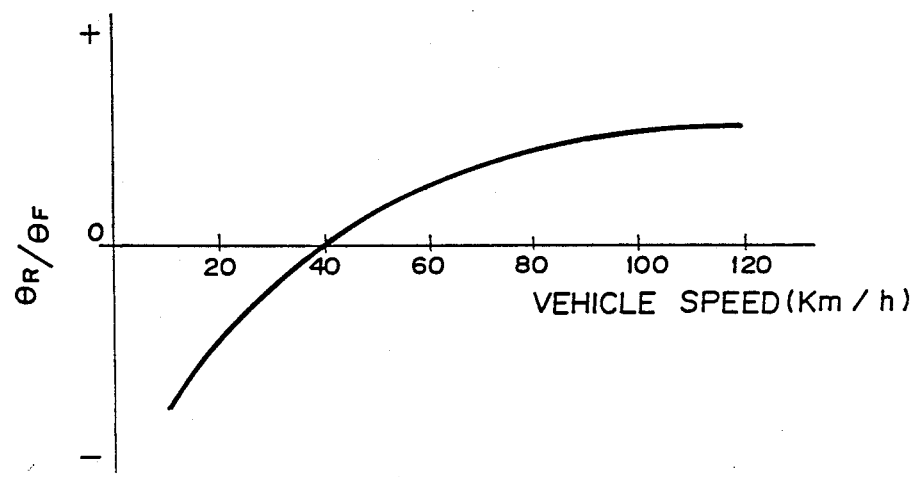
FIG. 6 is a graph showing the relation between the rear wheel turning angle ratio and the vehicle speed.

The controller (CPU) 23 which receives a vehicle speed signal from the vehicle speed sensor 22 controls the pulse motor 21 to change the rear wheel turning angle ratio and the turning phase on the basis of the four-wheel steering characteristics shown in FIG. 6 in this particular embodiment. In FIG. 6, when the rear wheels 7L and 7R are turned in the same direction as the front wheels 1L and 1R, the rear wheel turning angle ratio $\theta_R/\theta_F$ (wherein $\theta_R$ represents the rear wheel turning angle and $\theta_F$ represents the front wheel turning angle) is defined to be positive, and when the former are turned in the direction opposite to the latter, the rear wheel turning angle ratio $\theta_R/\theta_F$ is defined to be negative. In accordance with the four-wheel steering characteristics shown in FIG. 6, when the vehicle speed is relatively low, the rear wheels 7L and 7R are turned in the direction opposite to the front wheels 1L and 1R in order to improve heading performance of the vehicle. When the vehicle speed is 40 Km/h, the rear wheels are not turned irrespective of the front wheel turning angle. When the vehicle speed is relatively high, the rear wheels 7L and 7R are turned in the sam direction as the front wheels 1L and 1R in order to increase road gripping force of the rear wheels 7L and 7R during cornering. The rear wheel turning angle ratio sensor 24 is very important to the four-wheel steering system and accordingly, the sensor 24 is placed above the rear wheel turning rod 9 in order to protect it from stones and the like during travel as clearly shown in FIG. 3.

Figure 4:
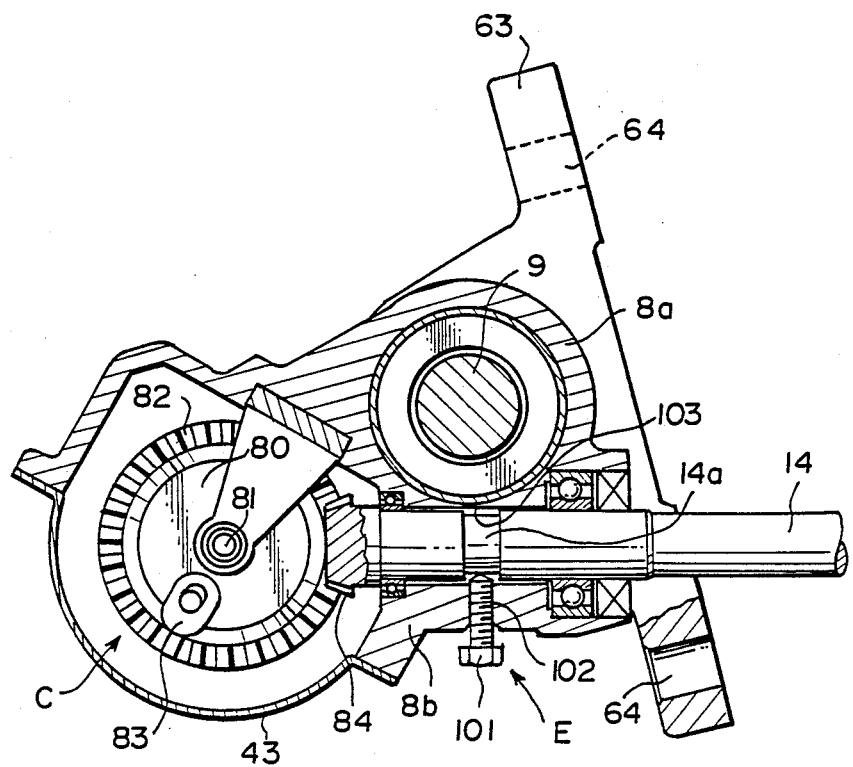

As shown in FIG. 4, the input shaft 14 of the rear wheel turning angle ratio changing mechanism C extends through a through hole 103 formed by the casings 8a and 8b, and a threaded lock hole 102 is formed in the casing 8b to extend in perpendicular to the through hole 103 and to open to the through hole 103. The input shaft 14 is formed with a small diameter portion 14a at a portion opposed to the lock hole 102 and a lock bolt 101 is screwed into the lock hole 102 to project into the through hole 103 and t be retracted therefrom. The lock bolt 101 forms a lock means E. That is, when the lock bolt 101 is screwed into the lock hole 102 to project into the through hole 103, the tip of the lock bolt 101 abuts against the outer surface of the small diameter portion 14a of the input shaft 14 to prevent revolution of the input shaft 14.

An example of a checking apparatus which can be used for effecting toe-in adjustment and four-wheel steering characteristic check will be described in detail with reference to FIGS. 7 to 18, hereinbelow.

Figure 7:
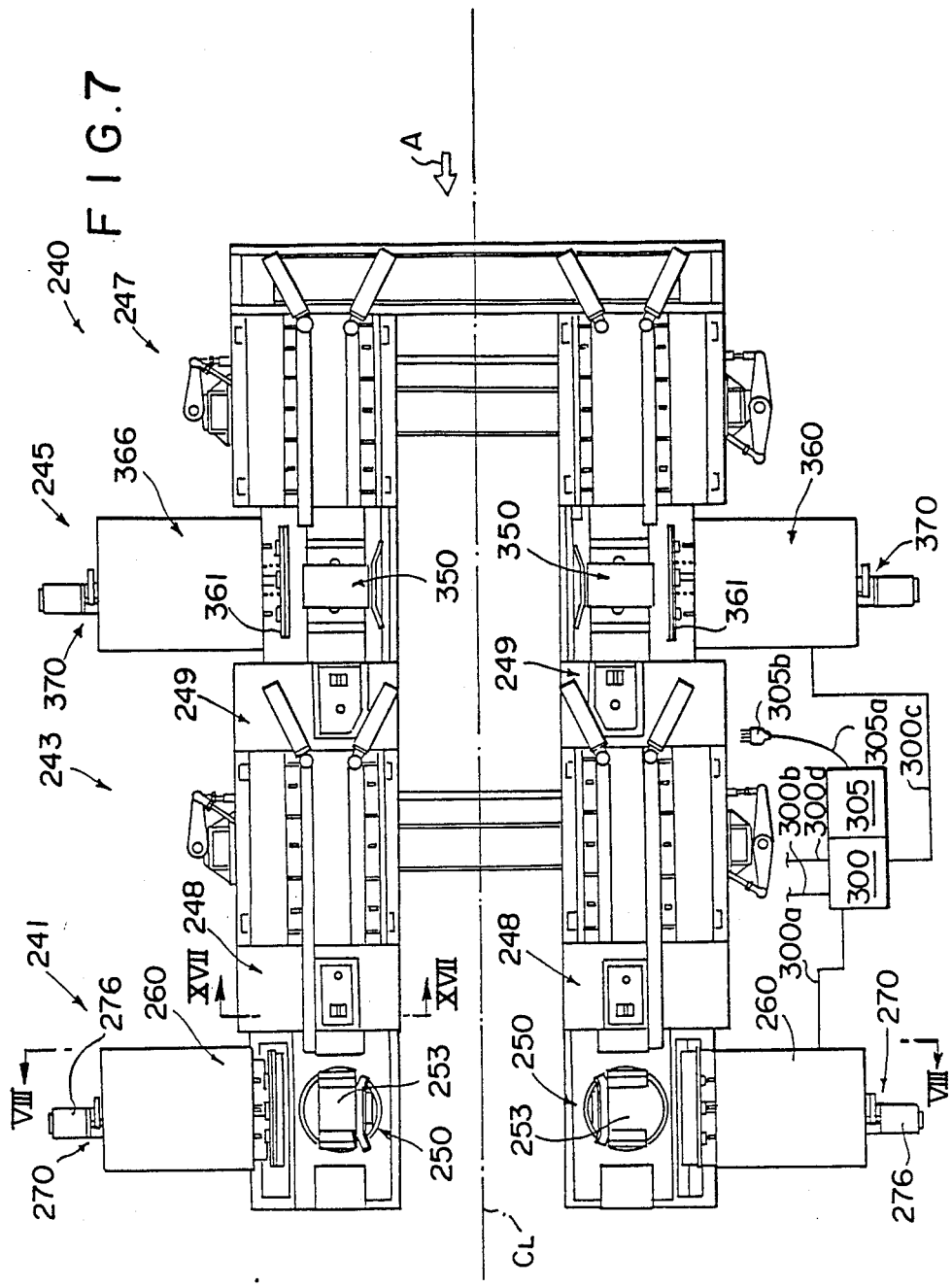
FIG. 7 is a plan view of a checking apparatus.

In FIG. 7, the apparatus 240 of this embodiment comprises a front wheel static tester 241 for measuring the angle of toe-in of the front wheels, the front wheel turning angle and the like, a front wheel guide 243 for guiding the left and right front wheels to the front wheel static tester 241, a rear wheel static tester 245 for measuring the angle of toe-in of the rear wheels, the rear wheel turning angle and the like, and a rear wheel guide 247 for guiding the left and right rear wheels to the rear wheel static tester 245 arranged in a row. A vehicle is conveyed in the direction of arrow A to position the front wheels and the rear wheels respectively on the front wheel static tester 241 and the rear wheel static tester 245 under the guidance of the front wheel guide 243 and the rear wheel guide 247. The apparatus 240 is further provided with a simulation signal output means 305 which delivers simulation signals such as a fail signal, a vehicle speed signal and the like to the vehicle to be checked, and with a comparator means 300 which compares the actual four-wheel steering characteristics measured by this apparatus with a preset four-wheel steering characteristics. Measured values of the left and right front wheel turning angles and the left and right rear wheel turning angles are input into the comparator means 300 respectively through lines 300a to 300d. To the simulation signal output means 305 is connected a line 305a having a connector 305b adapted to be connected the controller 23 of the four-wheel steering system on the vehicle to be checked.

Figure 8:
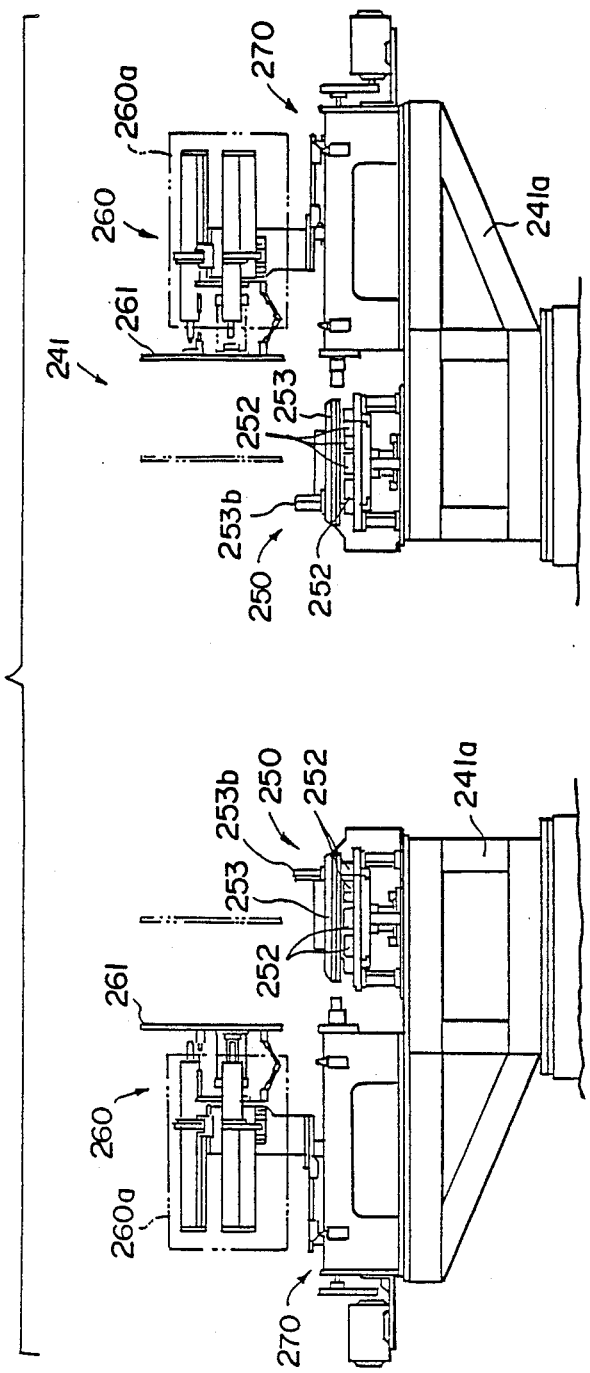
FIG. 8 is a cross-sectional view taken along line VIII—VIII in FIG. 7 and showing the front wheel static tester employed in the apparatus shown in FIG. 7.
Figure 9:
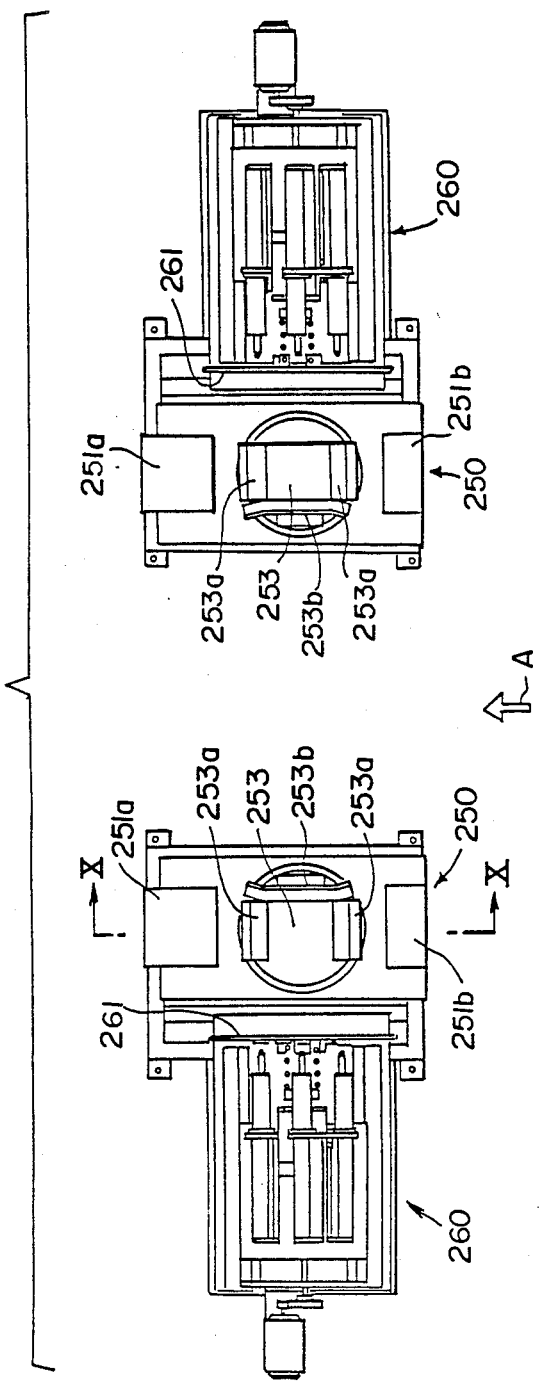
FIG. 9 is a plan view of the front wheel static tester.

As shown in detail in FIGS. 8 and 9, the front wheel static tester 241 comprises a pair of testers which are symmetrically disposed and respectively measure the angles of toe-in and the turning angles of the left and right front wheels. Each of the tester comprises a full float type turntable 250 which is mounted on a support base 241a and supports the front wheel to be able to turn and to be movable back and forth, a front wheel angle measuring means 260 which abuts against the side surface of the front tire placed on the turntable 250 to measure the angle of toe-in, the turning angle and the like, and a tester drive means 270 which is mounted on the support base 241a and moves the front wheel angle measuring means 260 in the transverse direction of the vehicle body to bring it into abutment against the side surface of the front tire. The front wheel angle measuring means 260 has a measuring plate 261 which is adapted to abut against the side surface of the front tire, and the angle of toe-in, the turning angle and the like of the front wheel are measured by measuring corresponding inclination angles of the measuring plate 261.

Figure 10:
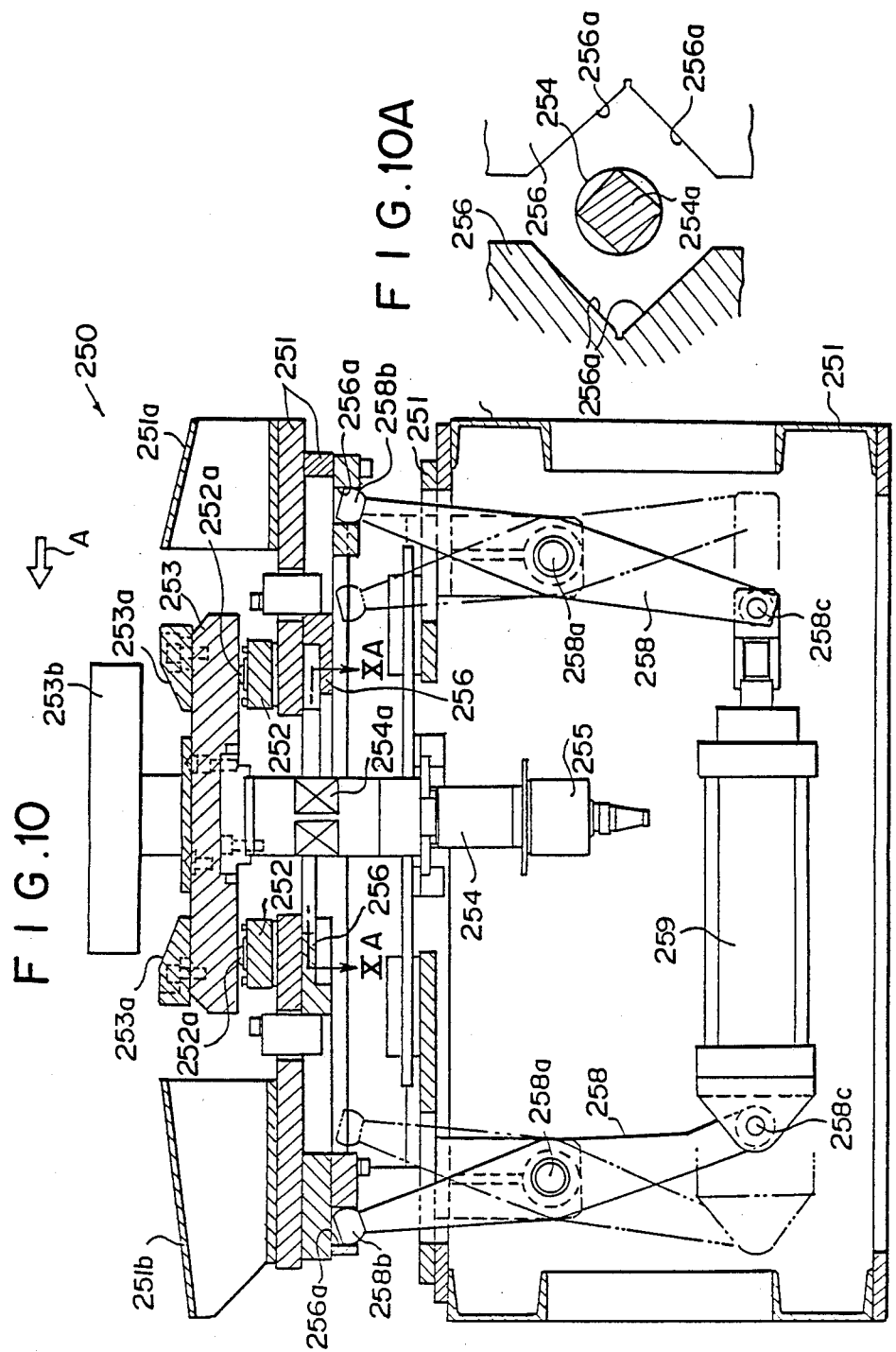
FIG. 10 is a cross-sectional view taken along line X—X in FIG. 9.
Figure 11:
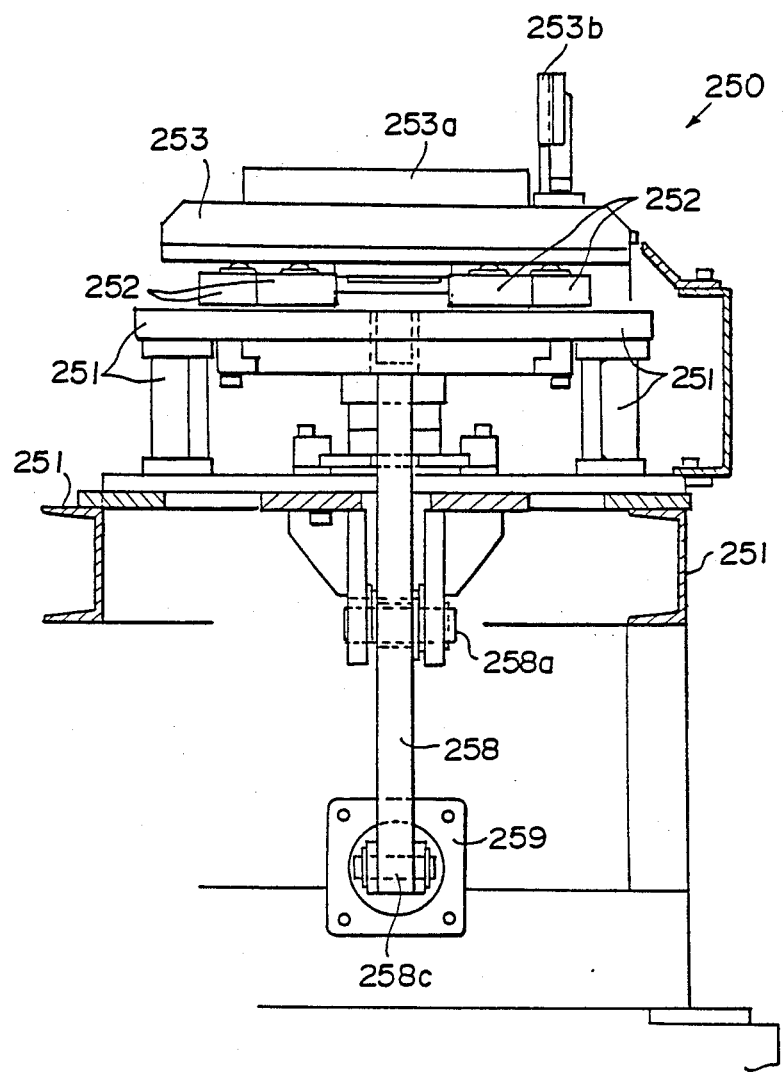
FIG. 11 is a side view showing the turntable for the front wheel.

As shown in detail in FIGS. 10 and 11, the turntable 250 has a frame 251 formed of a plurality of members fixed to the support base 241a, and a plurality of bearings 252 are arranged in a circle and fixed to the top surface of the frame 251. Each of the bearings 252 has a ball 252a supported for rotation, and the balls 252a of the respective bearings 252 support a table 253 to be rotatable and to be movable left and right and back and forth. The table 253 is for supporting the front wheel placed thereon, and is provided with guides 253a for locating the front wheel in the longitudinal direction of the vehicle body and a guide 253b which is adapted to abut against the inner side surface of the front wheel to locate the front wheel in the transverse direction of the vehicle body. A rotational shaft 254 is fixed to the center of the table 253 to extend downward therefrom, and an encoder 255 for detecting the angular position of the table 253 is mounted on the lower end of the rotational shaft 254. Transfer plates 251a and 251b are provided respectively on the front and rear sides of the table 253 in order to facilitate transfer of the front wheel to the table 253. A pair of shaft holding plates 256 are mounted on the frame 251 to be opposed to each other on the front and rear sides of the rotational shaft 254 and to be movable back and forth. Each of the shaft holding plates 256 is connected to the upper end 258b of an arm 258 which is mounted for rotation on the frame 251 at an intermediate portion 258a. The lower portions 258c of the arms 258 connected to the respective shaft holding plates 256 are respectively connected to opposite ends of a cylinder 259 so that the shaft holding plates 256 are moved back and forth in opposite directions in response to telescopic movement of the cylinder 259. That is, when the cylinder 259 expands, the plates 256 are moved toward each other, and when the cylinder 259 contracts, the plates 256 are moved away from each other. As clearly shown in FIG. 10A, on the opposed ends of the shaft holding plates 256, there are formed recesses 256a which are right triangles in shape, and the portion 254a of the rotational shaft 254 opposed to the recesses 256a is square in cross section to conform to the recesses 256a. When the cylinder 259 expands and the plates 256 are moved toward each other, the opposed recesses 256a grip the portion 254a of the rotational shaft 254 to fix the shaft 254. In this state, the table 253 is fixed with the guides 253a directed in the longitudinal direction of the vehicle body.

Figure 12:
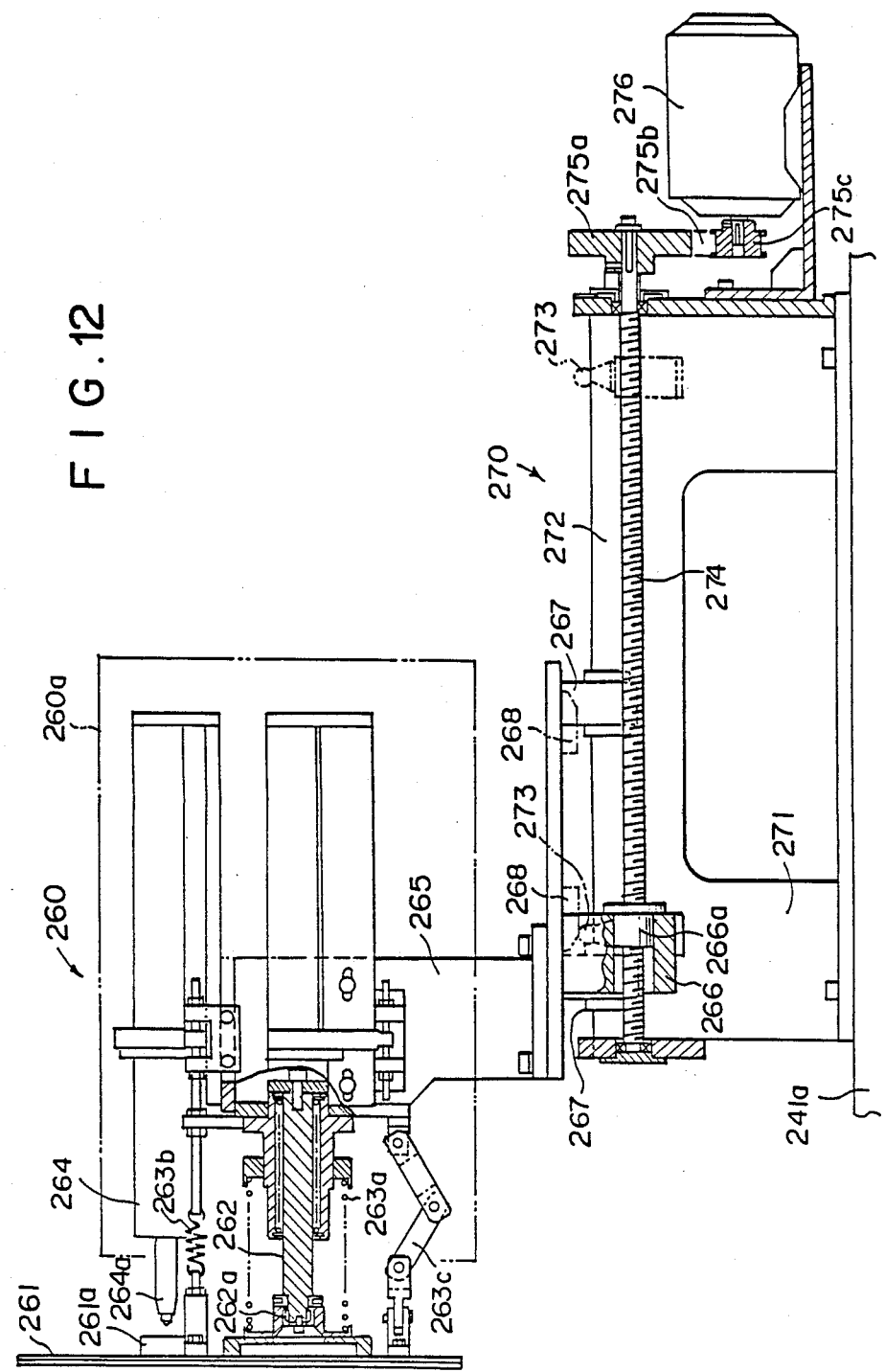
FIGS. 12 to 14 are respectively a front elevational view, a plan view and a side view showing the front wheel measuring means and the tester drive means.
Figure 13:
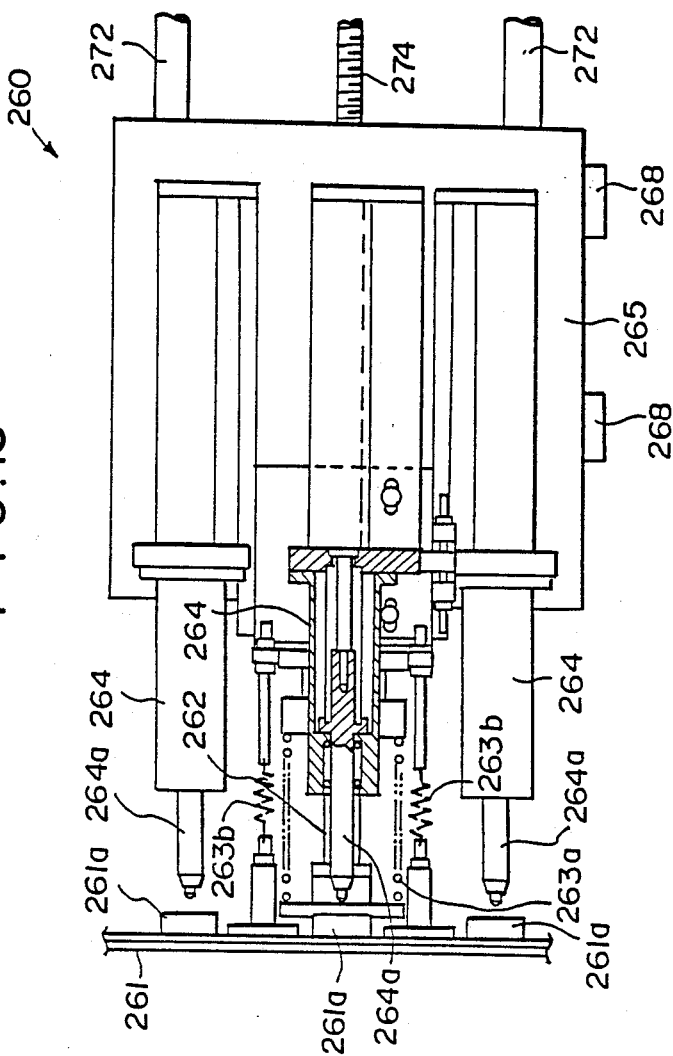
Figure 14:
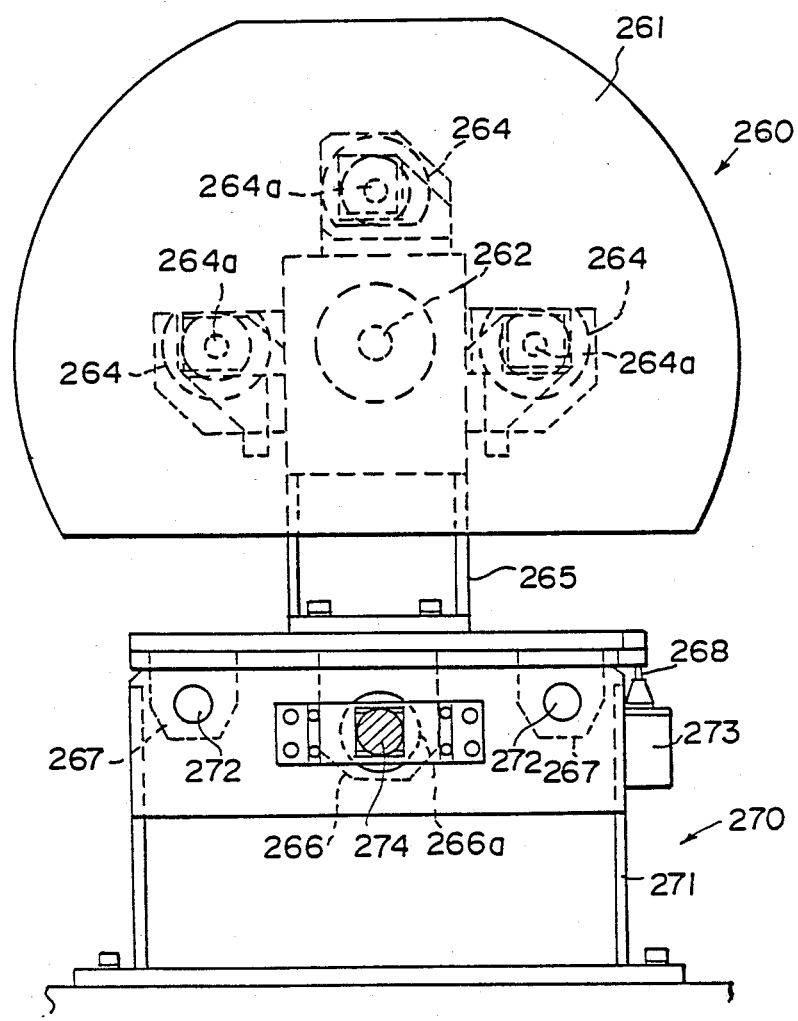

Now, referring FIGS. 12 to 14, the front wheel angle measuring means 260 and the tester drive means 270 will be described. The front wheel angle measuring means 260 comprises a support shaft 262 mounted on a frame 265, and the measuring plate 261 is rotatably mounted on the free end of the support shaft 262 by way of a ball joint 262a. The measuring plate 261 is held in a vertically erected state by a compression spring 263a, a tensile spring 263b and a link 263c. When an external force acts on the measuring plate 261, the measuring plate 261 rotates about the ball joint 262a with the springs 263a and 263b being deflected and the link 263c being deformed according to the external force acting on the measuring plate 261. That is, when the measuring plate 261 is brought into abutment against the side surface of the front tire, the measuring plate is inclined to conform to the position of the front tire, and accordingly, by measuring the inclination angles of the measuring plate 261, the angle of toe-in, turning angle, camber angle and the like can be measured. In order to measure the inclination angles, three displacement measuring devices 264 are mounted on the frame 65. The measuring devices 264 respectively have probes 264a which project toward the measuring plate 261 and are movable toward and away from the measuring plate 261. The three probes 264a are respectively disposed on the left and right sides and the upper side of the ball joint 262a as shown in FIG. 14. The probes 264a are adapted to abut against abutment seats 261a on the rear surface of the measuring plate 261 when the measuring plate 261 abuts against the side surface of the tire. Accordingly, inclinations of the measuring plate 261 produce differences in the amount of movement among the probes 264a, and the angle of toe-in, the turning angle, the camber angle and the like of the front wheel can be known by way of the differences. More particularly, the angle of toe-in and the turning angle of the front wheel can be measured by way of the difference in the amount of movement between the probes 264a on the left and right side of the ball joint 262a, and the camber angle can be measured by way of the average of amounts of movement of the probes 264a on the left and right side of the ball joint 262a, and the amount of movement of the probe 264a on the upper side of the ball joint 262a. In order to adjust the angle of toe-in and to measure the turning angle, the displacement measuring device on the upper side of the ball joint 262a may be omitted. As shown by the double dotted line in FIG. 12, the displacement measuring devices 264 are covered with a cover 260a.

The front wheel angle measuring means 260 is moved back and forth by the tester drive means 270 by way of the frame 265. The tester drive means 270 has a frame 271 fixed to the support base 241a. The frame 271 supports a pair of guide rods 272 and a lead screw 274 extending between the guide rods 272. A pair of guide legs 267 fixedly mounted on the lower surface of the frame 265 for the front wheel measuring means 260 are fit on each of the guide rods 272 for sliding movement. A conveying leg 266 having a screw bushing 266a is fixedly mounted on the lower surface of the frame 265 and the screw bushing 266a is engaged with the lead screw 274. The lead screw 274 is supported for rotation on the frame 271 and a first sprocket 275a mounted on one end of the lead screw 274 is drivingly connected by way of a chain 275b to a second sprocket 275c mounted on the output shaft of a motor 276 so that when the motor 276 is energized and the lead screw 274 is rotated, the front wheel angle measuring means 260 is moved back and forth by way of the conveying leg 260. A pair of limit switches 273 are mounted on the frame 271 for the tester drive means 270 spaced from each other in the longitudinal direction of the lead screw 274, and a pair of switch plates 268 which are adapted to abut against the limit switches 273 are mounted on the frame 265 for the front wheel angle measuring means 260 in order to control the motor 276 to determine the foremost and rearmost positions of the front wheel angle measuring means 260.

Figure 15:
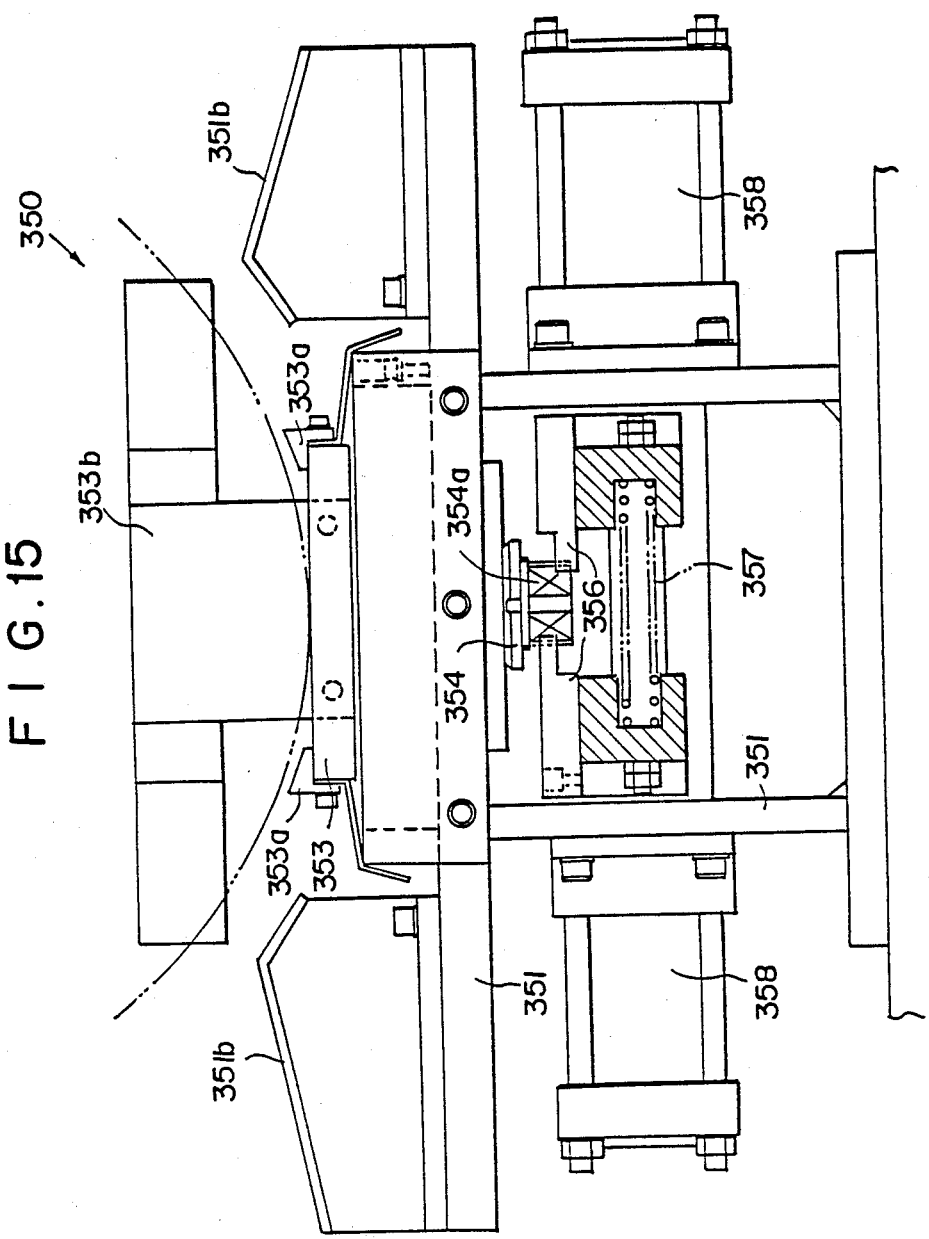
FIG. 15 is a front elevational view of the turn table for the rear wheels.

The rear wheel static tester 245 comprises a pair of testers similarly to the front static tester 241. Each of the testers of the rear wheel static tester 245 comprises a full float type turntable 350, a rear wheel angle measuring means 360 and a tester drive means 370. As shown in FIG. 15, the turntable 350 comprises a frame 351, a plurality of bearings (not shown) mounted on the frame 351, and a table 353 supported by the bearings to be rotatable and to be movable left and right and back and forth. The turntable 350 is substantially the same in the structure as the turntable 250 for the front wheel though the former is somewhat different from the latter in shape. Accordingly, the turntable 350 will not be described in detail here. A rotational shaft 354 extends downward from the lower surface of the table 353. The rotational shaft 354 is shorter than the rotational shaft 254 of the table 253 for the front wheel and is not provided with an encoder unlike the rotational shaft 254 of the table 253. That is, since the front wheels are turned by a large angle, the front wheel turning angle cannot be measured solely by the front wheel angle measuring means 260, and accordingly, when the front wheel turning angle is within a range of plus or minus 5° from the straight-ahead position, the front wheel turning angle is measured with a high accuracy by the front wheel angle measuring means 260, and otherwise, the front wheel turning angle is measured by the encoder 255. On the other hand, the rear wheels are turned only by a little angle, for instance 5° on opposite sides of the straight-ahead position, the rear wheel turning angle can be measured by the rear wheel angle measuring means 360 by itself. The rotational shaft 354 has a lower end portion 354a having a square cross-section. A pair of shaft holding plates 356 are opposed to each other with the square lower end portion 354a of the rotational shaft 354 intervening therebetween. The shaft holding plates 356 are normally urged away from each other by a spring 357. The holding plates 356 are respectively driven by a pair of cylinders 358 toward each other overcoming the force of the spring 357 to grip the portion 354a of the rotational shaft 354, thereby fixing the shaft 354. The rear wheel angle measuring means 360 and the tester drive means 370 of the rear wheel static tester 245 are substantially the same as those of the front wheel static tester 241, and will not be described here.

Figure 16:
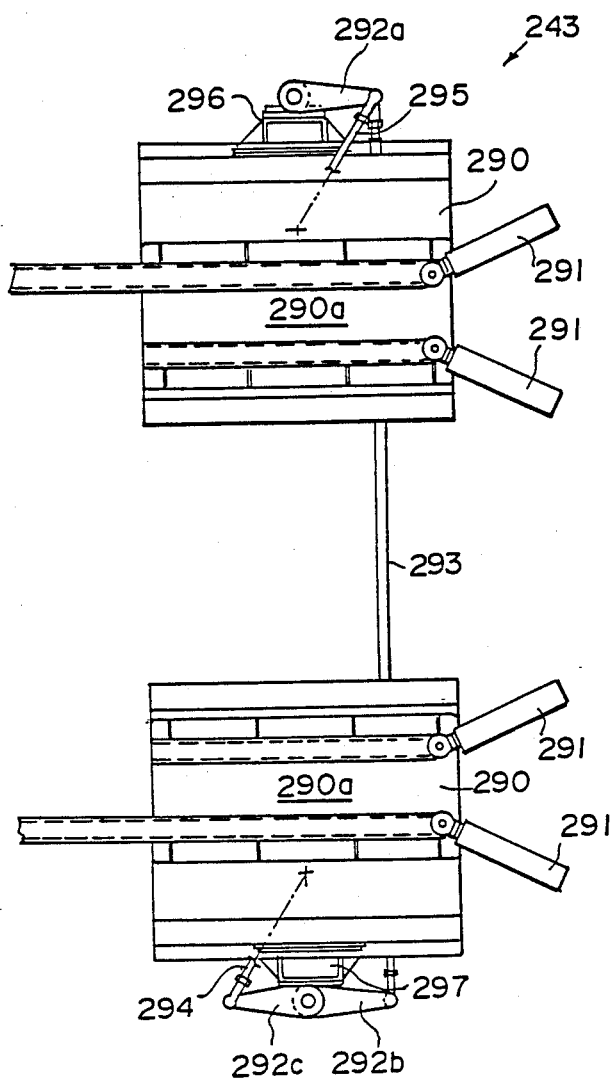
FIG. 16 is a plan view of the front wheel guide.

The front wheel guide 243 for guiding the front wheels to the front wheel static tester 241 and the rear wheel guide 247 for guiding the rear wheel static tester 245 are the same in shape and structure, and accordingly, only the front wheel guide 243 will be described with reference to FIG. 16, hereinbelow. As shown in FIG. 16, the front wheel guide 243 includes a pair of guide members 290 respectively having guide grooves 290a for guiding the left and right front wheels to the left and right testers of the front wheel static tester 241. The guide members 290 are movable in the transverse direction of the vehicle body. Further each guide member 290 is provided with a pair of guide plates 291 diverging away from each other in the direction opposite to the vehicle conveying direction so that the corresponding front wheel can be correctly guided to the guide groove 290a. A first arm 292a is mounted for rotation on a frame 296 opposed to the outer side surface of the right guide member 290 and a second arm 292b is mounted for rotation on a frame 297 opposed to the outer side surface of the left guide member 290. The first and second arms 292a and 292b are connected by a first connecting rod 293. The first arm 292a is connected to the right guide member 290 by a second connecting rod 295. A third arm 292c integrally formed with the second arm 292b is mounted for rotation on the frame 297 to extend forward (leftward as seen in FIG. 16) and is connected to the left guide member 290 by a third connecting rod 294. Accordingly, by moving the first connecting rod 293 in the transverse direction by a suitable drive means such as a cylinder (not shown), the guide members 290 are transversely moved in opposite directions, whereby the distance between the guide members 290 can be changed according to the tread of the front wheels of the vehicle to be checked.

A pair of lifters 248 and 249 (FIG. 7) for lifting the vehicle body are respectively provided on the front and rear sides of the front wheel guide 243. As shown in FIG. 17, the lifter 248 (249) comprises a frame 305 and a cylinder 302 vertically fixed to the frame 305. The cylinder 302 has a rod 301 projecting upward, and a head 301a having a groove 301b is mounted on the top of the rod 301. When the rod 301 is moved upward, the groove 301b on the head 301a engages with the side sill of the vehicle body and the vehicle body is lifted. When an external force acts on the vehicle body in a horizontal direction while the front and rear wheels are placed on the full float type turntables, the turntables and the vehicle body are moved to adversely affect measurements by the front wheel angle measuring means and the rear wheel angle measuring means. By supporting the vehicle body applying an upward force by the lifter, movement of the vehicle body and the turntable can be prevented, and at the same time, the weight acting on the tires on the turntables can be reduced, whereby deformation of the tires can be reduced and load on the turntables can be reduced, thereby facilitating rotation of the turntables.

In accordance with an embodiment of the present invention, the four-wheel steering system shown in FIGS. 1 to 5 is incorporated in a vehicle by use of the apparatus 240 in the following manner. That is, the cylinders 259 and 358 of the front wheel turntable 250 and the rear wheel turntable 350 are first expanded to bring the shaft holding plates 256 and 356 into engagement with the rotational shafts 254 and 354, thereby fixing them, and then the vehicle is conveyed from the right side as seen in FIG. 7 in the direction of arrow A so that the front wheels 1L and 1R and the rear wheels 7L and 7R are respectively positioned on the front wheel static tester 241 and the rear wheel static tester 245 under the guidance of the front wheel guide 243 and the rear wheel guide 247. This is done with the connection between the front turning mechanism A and the rear wheel turning mechanism B being released by removing the universal joint 18 between the relay shaft 19 and the input shaft 14 of the rear wheel turning angle ratio changing mechanism C. Then the lifters 248 and 249 are operated to lift the side sill of the vehicle body, thereby reducing load on the turntables 250 and 350 and holding the vehicle body not to be moved horizontally under an external force. Lift of the vehicle body should be controlled so that there remains on the tables 253 and 353 such load as to smoothly rotate the tables 253 and 353 in response to turning of the front and rear wheels. Thereafter, the cylinders 259 and 358 are contracted so that the shaft holding plates 256 and 356 release the rotational shafts 254 and 354 to bring the tables 253 and 353 into full floated state.

Figure 19:
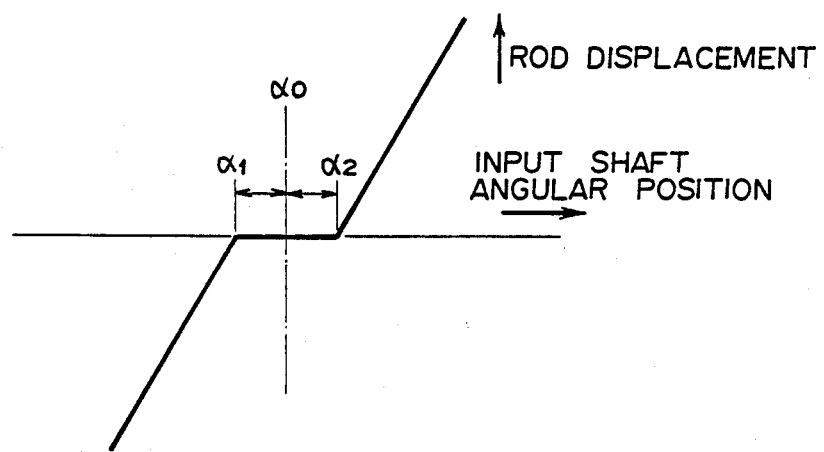
FIG. 19 is a graph to be used for locating the neutral state of the rear wheel turning angle ratio changing mechanism.

Then the rear wheel turning rod 9 is positioned in the neutral position and the rear wheel turning angle ratio changing mechanism C is brought into a state corresponding to the neutral position of the rear wheel turning rod 9. (This state will be referred to as the "neutral state", hereinbelow.) The rear wheel turning angle ratio changing mechanism C can be brought into the neutral state in the following manner. First the input shaft 14 is released by unscrewing the lock bolt 101, and then the pulse motor 21 is energized so that the holder 34 is rotated by a certain angle and the rear wheel turning angle ratio changing mechanism C gives a positive or negative rear wheel turning angle ratio. Thereafter the oil pump 30 is operated to provide hydraulic pressure to the hydraulic actuator D and the input shaft 14 of the rear wheel turning angle ratio changing mechanism C is turned left and right, and change in displacement of the rear wheel turning rod 9 with rotation of the input shaft 14 is measured to obtain a graph such as shown in FIG. 19. As can be understood from FIG. 19, the rear wheel turning rod 9 is displaced in response to rotation of the input shaft 14 though there is an insensitive zone in which the rear wheel turning rod 9 remains stationary irrespective of rotation of the input shaft 14. The insensitive zone corresponds to the angular position range of the input shaft 14 in which the hydraulic pressure supplied to the cylinder 12 is weaker than the precompressing force which has been provided to the return spring 42. Accordingly, by positioning the input shaft 14 at the center of the insensitive zone, that is, at the middle angular position $a_0$ between the angular positions $a_1$ and $a_2$ in FIG. 19, the rear wheel turning angle ratio changing mechanism C can be brought into the neutral state. Then the input shaft 14 is locked at the position by screwing the lock bolt 101 into the lock hole 102 to abut against the small diameter portion 14a of the input shaft 14. Thereafter, toe adjustment of the rear wheels and the front wheels are effected and the front wheel turning mechanism A and the rear wheel turning mechanism B are connected by connecting the input shaft 14 and the relay shaft 19 with the universal joint 18. Finally the lock of the input shaft 14 is released.

Figure 20A:
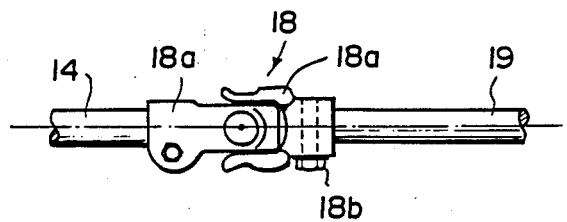
FIG. 20A is an enlarged plan view showing the universal joint connecting the input shaft and the relay shaft.
Figure 20B:
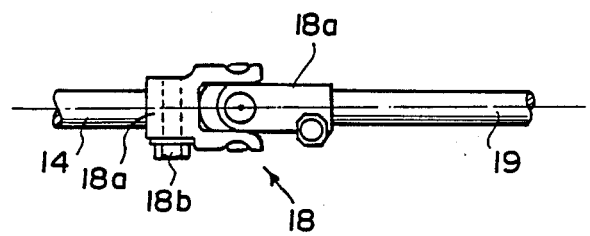
FIG. 20B is a side view of FIG. 20A.
Figure 20C:
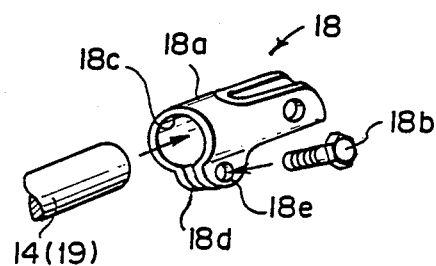
FIG. 20C is an exploded perspective view of the joint member.
Figure 21:
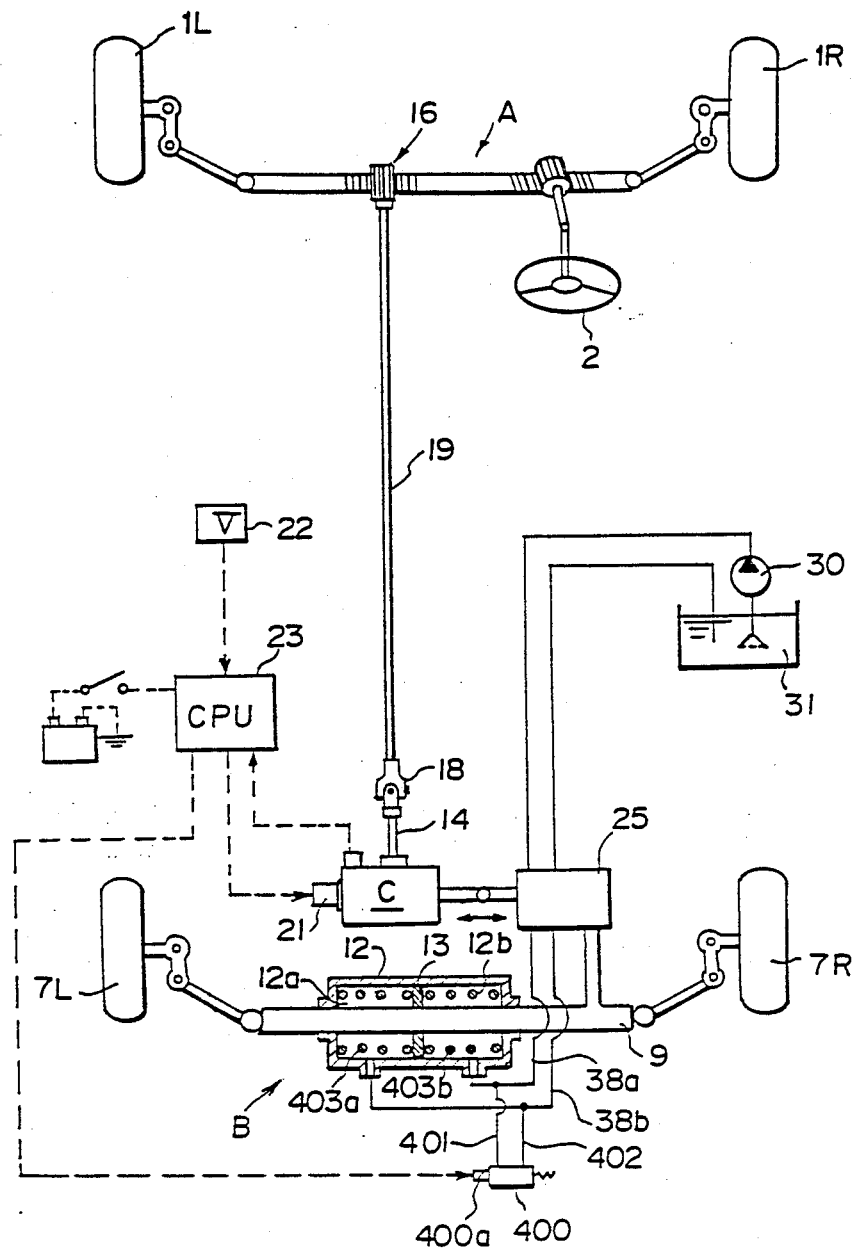
FIG. 21 is a plan view showing a four-wheel steering system provided with a fail-safe mechanism.

As shown in FIGS. 20A to 20C, the universal joint 18 comprises a pair of U-shaped joint members 18a respectively fixed to the opposed ends of the input shaft 14 and the relay shaft 19. As shown in FIG. 20C, by inserting the end of the shaft 14 (19) into a shaft inserting portion 18c having a slit 18d, and screwing a bolt 18b into a bolt hole 18e to narrow the slit 18d, the shaft is fixed to the joint member 18a.

The larger the absolute value of the rear wheel turning angle ratio is, the more clear the ends of the insensitive zone are, and accordingly, it is preferred that the holder 73 be turned so that the absolute value of the rear wheel turning angle ratio is maximized. Further, in FIG. 19, the hydraulic pressure in the hydraulic pressure chambers 12a and 12b may used as the abscissa instead of the angular position of the input shaft 14.

Though the rear wheel turning angle ratio changing mechanism C can be brought into the neutral state also by positioning the input shaft 14 so that the pivoted arm 71 is positioned vertical since the four wheel steering system described above is so designed, the method described above is preferable in view of manufacturing errors in the parts.

It is preferred that after the lock bolt 101 is unscrewed from the lock hole 102, a cap bolt which is shorter than the lock bolt 101 not to reach the input shaft 14 is screwed into the lock hole 102 to close the same. By screwing the lock bolt 101 home into the lock hole 102 so that the outer surface of the smaller diameter portion 14a is marked with the tip of the lock bolt 101, the position of the input shaft 14 corresponding to the neutral state of the rear wheel turning angle ratio changing mechanism C can be easily found later. Further, in the embodiment described, the lock bolt is used as the lock means. However, other various means may be used as the lock means.

Now, the method of adjusting toe-in of the front wheels and the rear wheels will be described.

In order to adjust toe-in of the rear wheels, the rear wheel angle measuring means 360 are moved toward the left and right rear wheels 7L and 7R by the tester drive means 370 to bring the respective measuring plates 361 into abutment against the outer side surface of the rear tires. Then inclinations of the plates 361 are measured and the measured values are compared with a predetermined angle of toe-in for the rear wheels by the comparator means 300. When the measured values do not conform to the predetermined angle of toe-in, toe-in adjustment is effected on the rear wheel.

Figure 18A:
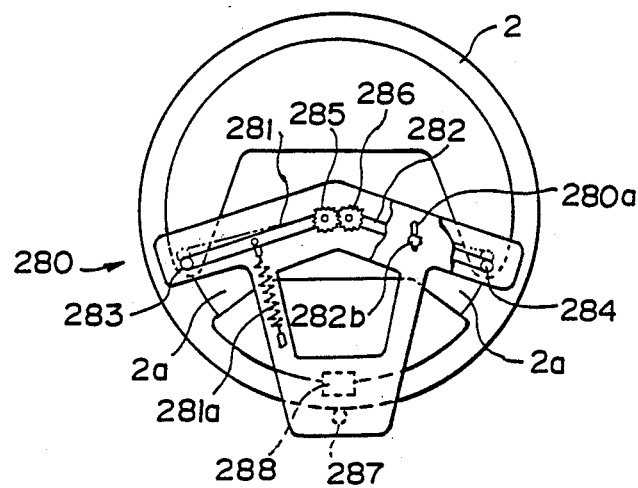
FIG. 18A is a front view showing a horizon measuring device.
Figure 18B:
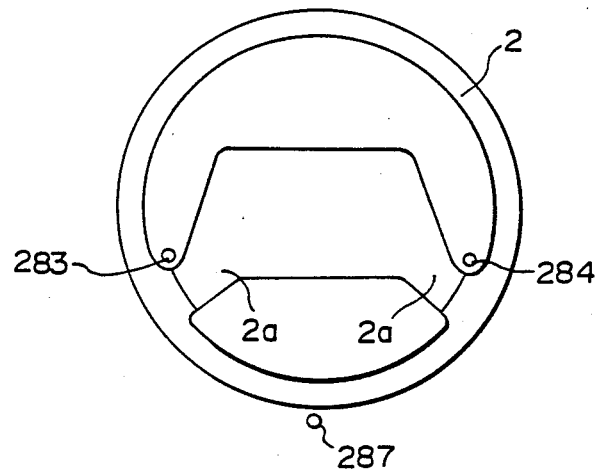
FIG. 18B is a view illustrating the positions of the movable pins and the stationary pins with respect to the steering wheel when the horizon measuring device is mounted on the steering wheel.

In order to adjust toe-in of the front wheels, horizon adjustment of the steering wheel 2 is first effected. A horizon measuring device 280 is mounted on the steering wheel 2 as shown in FIG. 18A. The horizon measuring device 280 has a pair of arms 281 and 282, and the arms 281 and 282 are provided on the respective outer ends with movable pins 283 and 284 which are adapted to be engaged with the wheel stay portions 2a. The arms 281 and 282 are supported for rotation of the measuring device 280 at the respective inner ends. Further, the arms 281 and 282 are provided on the respective inner ends with gears 285 and 286 in mesh with each other so that the arms 281 and 282 are rotated in synchronization with each other. The arm 281 is urged in the counterclockwise direction by a tensile spring 281a and the arm 282 is urged in the clockwise direction by a tensile spring not shown. Rotation of the arm 282 is guided by a pin 282b which is fixed to the arm 282 and is received in a slot 280a formed in the measuring device 280. Further, the measuring device 280 is provided with a stationary pin 287 adapted to be engaged with the steering wheel 2. The measuring device 280 is mounted on the steering wheel 2 by engaging the movable pins 283 and 284 with the wheel stay portions 2a and engaging the stationary pin 287 by rotating the arms 281 and 282 as shown in FIG. 18B. The measuring device 280 is provided with an angular position sensor 288 for detecting the angular position of the steering wheel 2. The angular position sensor 288 is a non-contact detector which comprises a magnetic reluctance element for linear displacement and a combination of a magnet and a pendulum, and converts inclination to the vertical into an electrical voltage. Deviation from the horizontal of the steering wheel 2 is detected by the sensor 288 and the deviation is corrected to position the steering wheel 2 in the correct horizontal position.

Thereafter, while holding the steering wheel 2 in the correct horizontal position, the front wheel angle measuring means 260 are moved toward the left and right front wheels 1L and 1R by the tester drive means 270 to bring the respective measuring plates 261 into abutment against the outer side surface of the front tires. Then inclinations of the plates 361 are measured and on the basis of the measured values, the comparator means 300 determines whether the front wheels 1L and 1R are in the straight-ahead position. The straight-ahead position of the front wheels is determined in conjunction with the straight-ahead position of the rear wheels 7L and 7R. Then the measured values are compared with a predetermined angle of toe-in for the front wheels by the comparator means 300. When the measured values do not conform to the predetermined angle of toe-in, toe-in adjustment is effected on the front wheel.

FIG. 20 shows an example of a known four-wheel steering system. This four-wheel steering system is substantially the same as the four-wheel steering system shown in FIG. 1 except that the lock means for locking the input shaft 14 of the rear wheel turning angle ratio changing mechanism C is not provided and the hydraulic actuator is provided with a fail-safe mechanism for fixing the rear wheels 7L and 7R to the straight-ahead position irrespective of the position of the front wheels 1L and 1R or the steering wheel 2. That is, the hydraulic lines 38a and 38b for communicating the hydraulic pressure chambers 12a and 12b of the cylinder 12 with the hydraulic chamber of the spool valve 25 are communicated with a normally closed fail-safe solenoid valve 400 having a solenoid 400a respectively by way of hydraulic lines 401 and 402. When the solenoid 400a is energized to open the valve 400, the hydraulic pressures in the hydraulic pressure chambers 12a and 12b are equalized to each other, and the piston 13 is held in the neutral position under the force of return springs 403a and 403b, whereby the rear wheel turning angle is fixed to 0.

In the case of the four-wheel steering system shown in FIG. 20, the rear wheels 7L and 7R can be brought into the neutral position and the rear wheel turning angle ratio changing mechanism can be brought into the neutral state by operating the fail-safe mechanism. This can be accomplished by inputing a simulation fail signal into the controller 23 from the simulation signal output means 305 of the checking apparatus.

Figure 22:
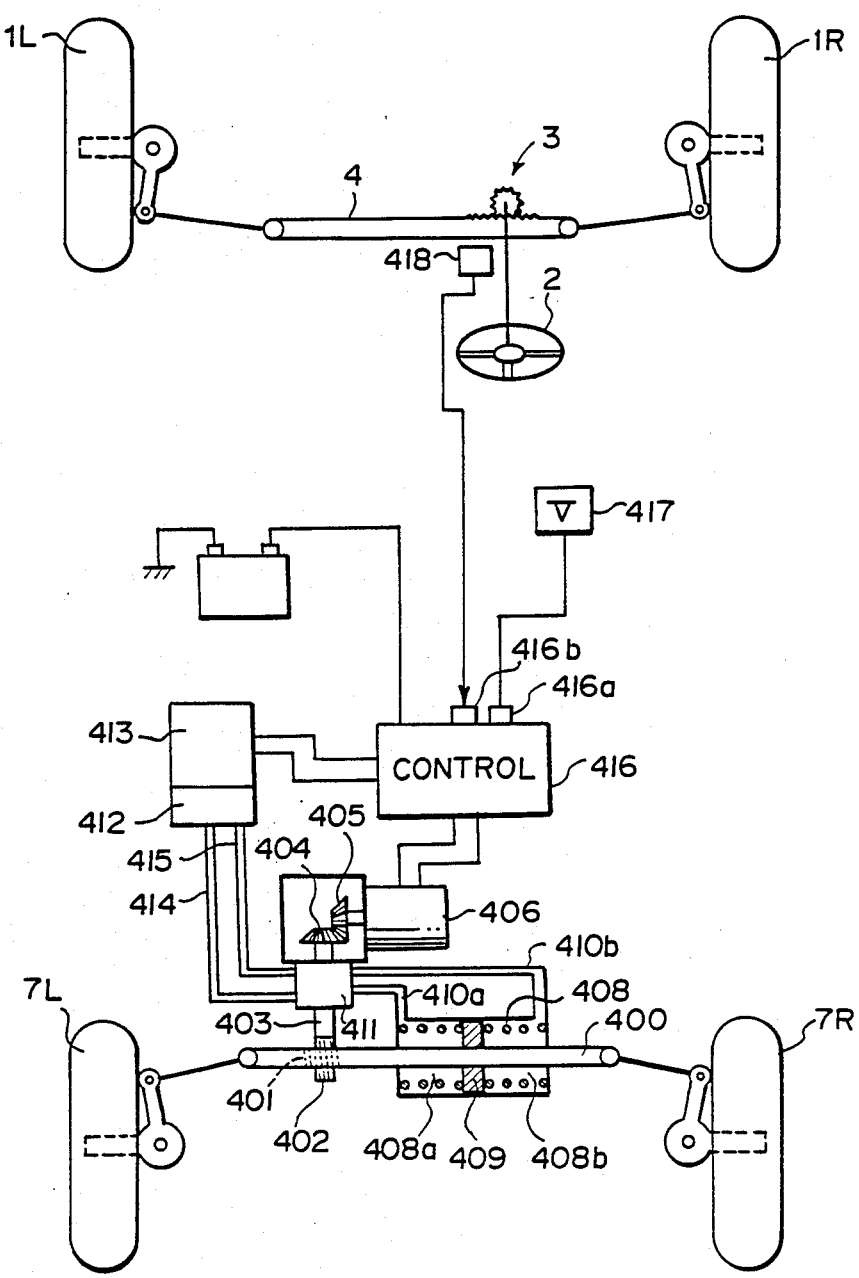
FIG. 22 is a plan view showing a four-wheel steering system in which the rear wheel turning mechanism is electrically connected with the front wheel turning mechanism.

FIG. 22 shows another example of the four-wheel steering system. In FIG. 22, the front wheels 1L and 1R are turned left and right in response to operation of the steering wheel 2 by way of a front wheel turning mechanism which is substantially the same as that shown in FIG. 1 and includes a rack-and-pinion system 3 and a front wheel turning rod 4. The rear wheels 7L and 7R are turned left and right in response to movement of a rear wheel turning rod 400 in the transverse direction of the vehicle body. The rear wheel turning rod 400 is provided with a rack 401 which is in mesh with a pinion 402 formed on one end of a pinion rod 403. A bevel gear 404 is fixedly mounted on the other end of the rod 403 and in mesh with a bevel gear 405 fixedly mounted on the output shaft of a pulse motor 406. That is, the rear wheel turning rod 400 is moved left or right depending on the rotational direction of the pulse motor 406 by an amount corresponding to the amount of rotation of the pulse motor 406. The rear wheel turning rod 400 extends through a power cylinder 408 and is provided with a piston 409 which is fixed to the rod 400 to divide the inner space of the cylinder 408 into left and right hydraulic pressure chambers 408a and 408b. Hydraulic pressure passages 410a and 410b from a control valve 411 associated with the pinion rod 403 are respectively connected to the left and right hydraulic pressure chambers 408a and 408b. The control valve 411 is connected to a pump 412 by way of hydraulic pressure supply passage 414 and a return passage 415. The pump 412 is driven by a motor 413. The control valve 411 operates according to rotational force applied to the pinion rod 403 upon rotation of the pulse motor 406 to introduce hydraulic pressure from the pump 412 into one of the pressure chambers 408a and 408b according to the direction of the rotational force applied to the pinion rod 403 and to return the hydraulic oil in the other chamber to the pump 412 through the return passage 415. Thus, when the rear wheel turning rod 400 is moved in the transverse direction of the vehicle body by the pulse motor 406 by way of the bevel gears 405 and 404, the pinion rod 403, the pinion 402 and the rack 401, the hydraulic pressure selectively introduced into the pressure chambers 408a and 408b assists in the movement of the rear wheel turning rod 400.

The pulse motor 406 is controlled by a controller 416. The controller 416 has a vehicle speed signal input terminal 416a and a front wheel turning angle signal input terminal 416b, and receives a vehicle speed signal from a vehicle speed sensor 417 and a front wheel turning angle signal from a front wheel turning angle sensor 418, and outputs a pulse motor driving signal and a pump driving signal on the basis of the vehicle speed signal and the front wheel turning angle signal. That is, the controller 416 determines the rear wheel turning angle on the basis of the front wheel turning angle and the vehicle speed.

Figure 23:
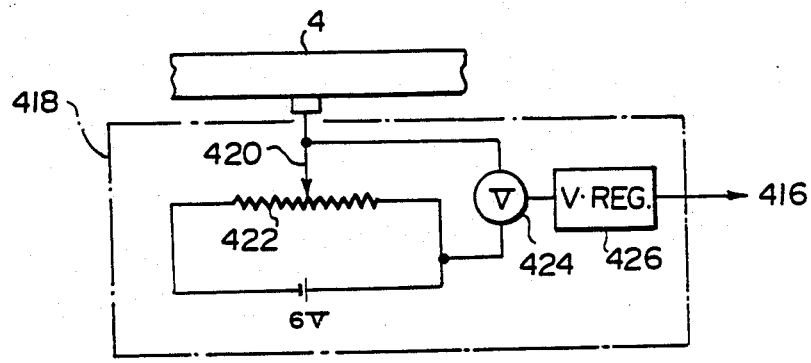
FIG. 23 is a view showing the front wheel turning angle sensor employed in the four-wheel steering system shown in FIG. 22.

As shown in FIG. 23, the front wheel turning angle sensor 418 includes a sliding terminal 420. The sliding terminal 420 is fixed to the front wheel turning rod 4 and is slid on a resistor 422 in response to transverse movement of the front wheel turning rod 4. According to the position of the sliding terminal 420, the electrical voltage detected by a voltmeter 424 changes. The output of the voltmeter 424 is delivered to the controller 416 by way of a voltage regulator 426.

Figure 24:
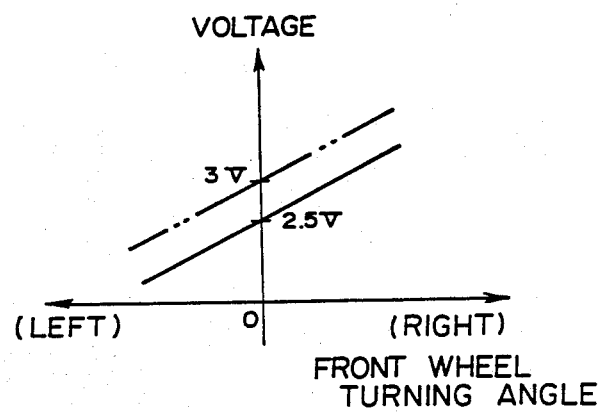
FIG. 24 is a graph showing an example of the relation between the electrical voltage and the front wheel turning angle.

In the case of the four-wheel steering system shown in FIG. 22, the controller 416 and the front wheel turning angle sensor 418 must be mutually electrically adjusted. For example, when the controller 416 is arranged to recognize the front wheel turning angle on the basis of the relation between the front wheel turning angle and the voltage shown by the chained line in FIG. 24, if the actual relation between the front wheel turning angle and the voltage output from the front wheel turning angle sensor 418 is as shown by the solid line in FIG. 24, the actual rear wheel turning angle ratio characteristics would deviate from the predetermined rear wheel turning angle ratio characteristics.

Accordingly, the controller 416 and the front wheel turning angle sensor 418 must be adjusted to operate on the basis of the same relation between the front wheel turning angle and the electric voltage. This adjustment must be effected with the controller 416 and the sensor 418 being electrically isolated from each other, and after the adjustment, toe-in of the front and rear wheels is adjusted and the front wheel turning mechanism and the rear wheel turning mechanism are operatively connected, i.e., the front wheel turning angle sensor 418 is connected to the controller 416.

In the embodiments described above, toe adjustment of the front wheels and the rear wheels is effected before the front wheel turning mechanism and the rear wheel turning mechanism are operatively connected. However, toe adjustment may be effected after the wheel turning mechanisms are connected together.

Figure 27:
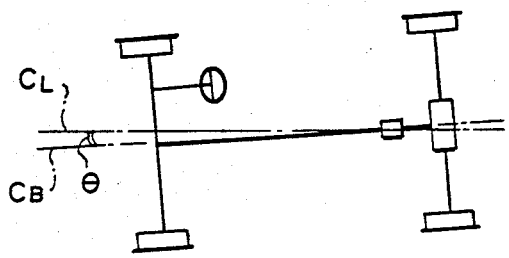
FIG. 27 is a schematic view showing the center line of the vehicle body with respect to the center line of the checking apparatus.

Now methods of adjusting toe-in of the front and rear wheels after the front wheel turning mechanism and the rear wheel turning mechanism are connected together will be described with reference to FIGS. 25 to 27, hereinbelow.

Figure 25:
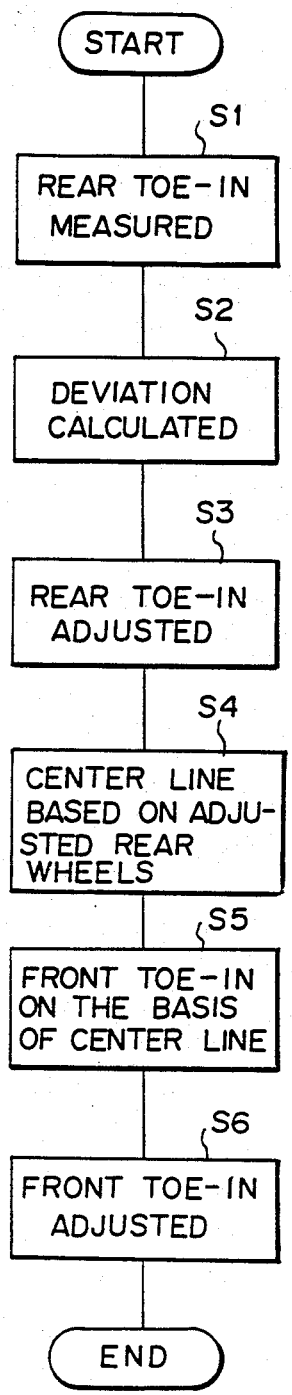
FIG. 25 shows a flow chart for illustrating a method of adjusting toe-in of the front and rear wheels after the front wheel turning mechanism and the rear wheel turning mechanism are operatively connected together.

In the method shown in FIG. 25, the vehicle is first placed on the checking apparatus 240 in the manner described above, and the toe-ins of the rear wheels are measured by way of the inclinations of the measuring plates 361 of the rear wheel angle measuring means 360 in step S1. The measured toe-ins are compared with a predetermined value and deviations therebetween are calculated in step S2. Then in step S3, toe-ins of the rear wheels are adjusted according to the respective deviations. In step S4, the center line of the vehicle body determined on the basis of the adjusted rear wheels, i.e., the line joining the middle point between the heels of the left and right rear wheels and the middle point between the toes of the left and right rear wheels, is calculated, and in step S5, toe-ins of the front wheels are calculated on the basis of the center line of the vehicle body thus obtained. The toe-ins of the front wheels are adjusted according to the measured values in step S6.

In the method shown in FIG. 25, toe-in of the rear wheels is first adjusted and toe-in of the front wheels is adjusted on the basis of the center line of the vehicle body determined on the basis of the adjusted rear wheels, and accordingly, the rear wheels must be adjusted before the front wheels. However, in the method shown in FIG. 26, adjustment of toe-in of the front wheels and adjustment of toe-in of the rear wheels may be effected separately from each other.

Figure 26:
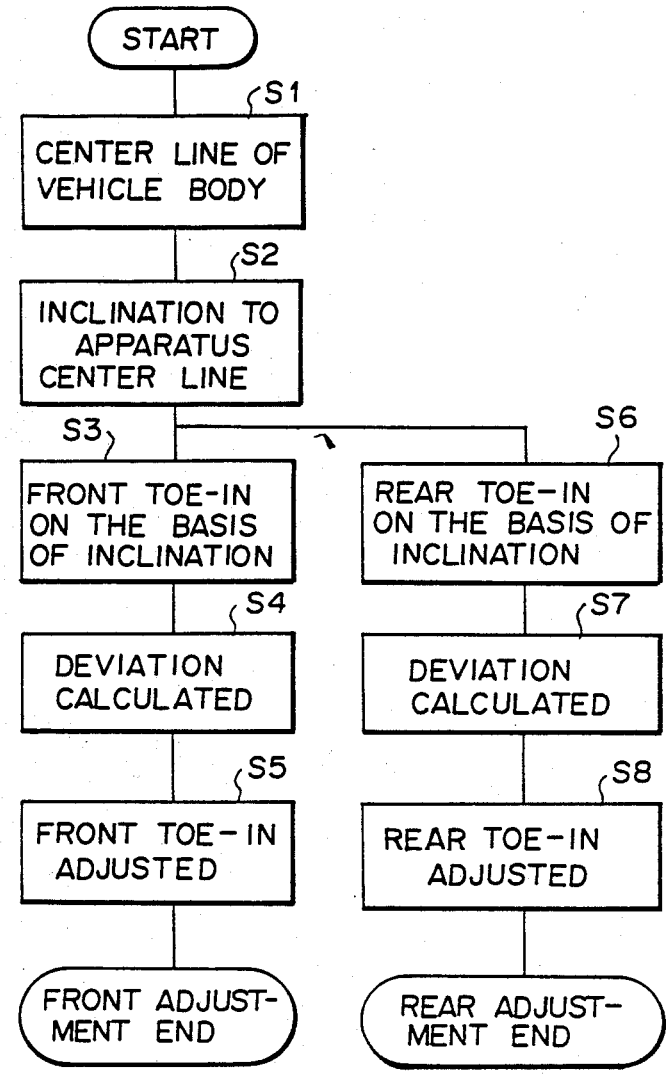
FIG. 26 shows a flow chart for illustrating another method of adjusting toe-in of the front and rear wheels after the front wheel turning mechanism and the rear wheel turning mechanism are operatively connected together.

In FIG. 26, the centers of the front wheels and the rear wheels are detected and the center line of the vehicle body is determined on the basis of the centers of the wheels in step S1. Then the inclination $\theta$ (FIG. 27) of the center line of the vehicle body $C_B$ to the center line $C_L$ of the checking apparatus 240 (FIG. 7) is calculated in step S2. Thereafter, adjustment of toe-in of the front wheels are effected in steps S3 to S5, and adjustment of toe-in of the front wheels are effected in steps S6 to S8. The steps S3 to S5 and the steps S6 to S8 can be effected independently from each other, that is, the steps S3 to S5 and the steps S6 to S8 may be effected at the same time, or may be effected one after the other. In the step S3, inclinations of the left and right front wheels are measured and toe-ins of the front wheels are calculated on the basis of the inclination $\theta$ of the center line $C_B$ of the vehicle body to the center line $C_L$ of the checking apparatus 240. In the step S4, the toe-ins of the front wheels thus calculated are compared with a predetermined value and deviations therebetween are calculated. Then in the step S5, toe-ins of the front wheels are adjusted according to the respective deviations. In the step S6, inclinations of the left and right rear wheels are measured and toe-ins of the rear wheels are calculated on the basis of the inclination $\theta$ of the center line $C_B$ of the vehicle body to the center line CL of the checking apparatus 240. In the step S7, the toe-ins of the rear wheels thus calculated are compared with a predetermined value and deviations therebetween are calculated. Then in the step S8, toe-ins of the rear wheels are adjusted according to the respective deviations.

In either of the methods shown in FIGS. 25 and 26, adjustment of toe-in of the front wheels is effected while the steering wheel 2 is held in the correct horizontal position.

In the above description, the front wheels and the rear wheels are positioned in the neutral position or the straight-ahead position and the rear wheel turning angle ratio changing mechanism is brought into the neutral state before the rear wheel turning mechanism is operatively connected with the front wheel turning mechanism. However, the front wheels and the rear wheels may be positioned in other positions provided that the position of the front wheels and the position of the rear wheels correspond to each other on the basis of a predetermined four-wheel steering characteristics. In this case, the rear wheel turning angle ratio changing mechanism is brought into the state corresponding to the positions of the front and rear wheels.

We claim:

1. A method of incorporating in a vehicle a four-wheel steering system having a front wheel turning mechanism for turning front wheels in response to operation of a steering wheel, a rear wheel turning mechanism for turning rear wheels, a control means for controlling the rear wheel turning mechanism to turn the rear wheels according to preset four-wheel steering characteristics and a connecting means which is connected to the control means to transmit front wheel turning information to the control means, thereby operatively connecting the front wheel turning mechanism with the rear wheel turning mechanism, comprising the steps of causing the front wheel turning mechanism and the rear wheel turning mechanism to bring the front wheels and the rear wheels to respective reference positions while the connecting means is operatively disconnected from the control means, bringing the control means into a reference state, and connecting the connecting means to the control means, the reference position of the front wheels and the reference position of the rear wheels corresponding to each other on the basis of the preset four-wheel steering characteristics, the reference state of the control means being a state corresponding to the reference positions of the front and rear wheels on the basis of the preset four-wheel steering characteristics.

2. A method as defined in claim 1 in which the reference positions of the front and rear wheels are the respective straight-ahead positions.

3. A method of incorporating in a vehicle a four-wheel steering system having a front wheel turning mechanism for turning front wheels in response to operation of a steering wheel, a rear wheel turning mechanism for turning rear wheels, a control means for controlling the rear wheel turning mechanism to turn the rear wheels according to preset four-wheel steering characteristics and a connecting means which is connected to the control means to transmit front wheel turning information to the control means, thereby operatively connecting the front wheel turning mechanism with the rear wheel turning mechanism, comprising the steps of causing the front wheel turning mechanism and the rear wheel turning mechanism to bring the front wheels and the rear wheels to respective reference positions while the connecting means is operatively disconnected from the control means, bringing the control means into a reference state, connecting the connecting means to the control means, and mechanically transmitting the front wheel turning information to the control means by the connecting means, the reference position of the front wheels and the reference position of the rear wheels corresponding to each other on the basis of the preset four-wheel steering characteristics, the reference state of the control means being a state corresponding to the reference positions of the front and rear wheels on the basis of the preset four-wheel steering characteristics.

4. A method as defined in claim 3 further comprising a step of adjusting toe-in of the front and rear wheels after the connecting means is connected to the control means.

5. A method as defined in claim 4 further comprising the steps of temporarily locking the control means to the reference state before connecting the connecting means to the control means, and releasing the control means after connecting ,the connecting means to the control means.

6. A method as defined in claim 3 further comprising a step of adjusting toe-in of the front and rear wheels after the steps of causing the front wheel turning mechanism and the rear wheel turning mechanism to bring the front wheels and the rear wheels to the respective reference positions and bringing the control means into a reference state, and before the step of connecting the connecting means to the control means.

7. A method as defined in claim 6 further comprising the steps of temporarily locking the control means to the reference state before the step of adjusting toe-in of the front and rear wheels and releasing the control means after the step of connecting the connecting means to the control means.

8. A method of incorporating in a vehicle a four-wheel steering system having a front wheel turning mechanism for turning front wheels in response to operation of a steering wheel, a rear wheel turning mechanism for turning rear wheels, a control means for controlling the rear wheel turning mechanism to turn the rear wheels according to preset four-wheel steering characteristics and a connecting means which is connected to the control means to transmit front wheel turning information to the control means, thereby operatively connecting the front wheel turning mechanism with the rear wheel turning mechanism, comprising the steps of causing the front wheel turning mechanism and the rear wheel turning mechanism to bring the front wheels and the rear wheels to respective reference positions while the connecting means is operatively disconnected from the control means, bringing the control means into a reference state, connecting the connecting means to the control means, and electrically transmitting the front wheel turning information to the control means by the connecting means, the reference position of the front wheels and the reference position of the rear wheels corresponding to each other on the basis of the preset four-wheel steering characteristics, the reference state of the control means being a state corresponding to the reference positions of the front and rear wheels on the basis of the preset four-wheel steering characteristics.

9. A method as defined in claim 8 further comprising a step of electrically matching the connecting means with the control means before the step of connecting the connecting means with the control means.

10. A method as defined in claim 9 further comprising a step of adjusting toe-in of the front and rear wheels after the connecting means is connected to the control means.

11. A method as defined in claim 10 further comprising the steps of temporarily locking the control means to the reference stat before connecting the connecting means to the control means, and releasing the control means after connecting the connecting means to the control means.

12. A method as defined in claim 9 further comprising a step of adjusting toe-in of the front and rear wheels after the steps of adjusting toe-in of the front and rear wheels after the steps of causing the front wheel turning mechanism and the rear wheel turning mechanism to bring the front wheels and the rear wheels to the respective reference positions and bringing the control means into a reference state, and before the step of connecting the connecting means to the control means.

13. A method as defined in claim 12 further comprising the steps of temporarily locking the control means to the reference stat before the step of adjusting toe-in of the front and rear wheels and releasing the control means after the step of connecting the connecting means to the control means.

14. A four-wheel steering system comprising a front wheel turning mechanism for turning front wheels in response to operation of a steering wheel, a rear wheel turning mechanism for turning rear wheels in response to turning of the front wheels, and a rotatable relay shaft which transmits the amount of turning of the front wheels to the rear wheel turning mechanism, characterized in that the rear wheel turning mechanism comprises a rear wheel turning rod which extends in the transverse direction of the vehicle body and is movable in the direction of the vehicle body to turn the rear wheels respectively connected to the left and right ends thereof by way of wheel supports, a control means which controls the rear wheel turning rod according to the amount of turning of the front wheels transmitted thereto through a rotatable input shaft connected to the relay shaft by way of a connecting means, and a locking means which is adapted to prevent rotational displacement of the input shaft.

15. A four-wheel steering system as defined in claim 14 in which the control means comprises a hydraulic actuator for driving the rear wheel turning rod and a controller which controls the hydraulic actuator according to the displacement of the input shaft.

16. A four-wheel steering system as defined in claim 14 in which the connecting means comprises a universal joint.

17. A method of incorporating in a vehicle a four-wheel steering system having a front wheel turning mechanism for turning front wheels in response to operation of a steering wheel, a rear wheel turning mechanism for turning rear wheels in response to turning of the front wheels according to preset four-wheel steering characteristics, and a rotatable relay shaft which transmits the amount of turning of the front wheels to the rear wheel turning mechanism, the rear wheel turning mechanism including a rear wheel turning rod which extends in the transverse direction of the vehicle body to turn the rear wheels respectively connected to the left and right ends thereof by way of wheel supports, a control means which controls the rear wheel turning rod according to the amount of turning of the front wheels transmitted thereto through a rotatable input shaft connected to the relay shaft by way of a connecting means, and a locking means which is adapted to prevent rotatable displacement of the input shaft, comprising the steps of effecting adjustment of the front wheels and the rear wheels while the input shaft is disconnected from the relay shaft and locked by the locking means, subsequently connecting the input shaft with the relay shaft by way of the connecting means, and releasing the lock of the input shaft by the locking means.

18. A method as defined in claim 17 in which the adjustment of the front wheels and the rear wheels is adjustment of toe of the front wheels and the rear wheels.

19. A method as defined in claim 17 further comprising the steps of causing the front wheel turning mechanism and the rear wheel turning mechanism to bring the front wheels and the rear wheels to respective reference positions and bringing the control means into a reference state, while the input shaft is disconnected from the relay shaft and released from the locking means, and subsequently locking the input shaft by the locking means before the step of effecting adjustment of the front wheels and the rear wheels, the reference position of the front wheels and the reference position of the rear wheels corresponding to each other on the basis of the preset four-wheel steering characteristics, the reference state of the control means being a state corresponding to the reference positions of the front and rear wheels on the basis of the preset four-wheel steering characteristics.

20. A method as defined in claim 19 in which the adjustment of the front wheels and the rear wheels is adjustment of toe of the front wheels and the rear wheels.

21. A four-wheel steering system comprising a front wheel turning mechanism for turning front wheels in response to operation of a steering wheel, a rear wheel turning mechanism for turning rear wheels in response to turning of the front wheels, and a relay shaft which transmits the amount of turning of the front wheels to the rear wheel turning mechanism, characterized in that the said rear wheel turning mechanism comprises a rear wheel turning rod which extends in the transverse direction of the vehicle body and is movable in the direction of the vehicle body to turn the rear wheels respectively connected to the left and right ends thereof by way of wheel supports, a means for urging the rear wheel turning rod to a neutral position in which the rear wheel turning rod supports the rear wheels in the respective straight-ahead positions, a hydraulic actuator which displaces the rear wheel turning rod in the transverse direction of the vehicle body from the neutral position, a control means which controls the hydraulic actuator according to the amount of turning of the front wheels transmitted thereto through the relay shaft, and a locking means which is adapted to prevent operation of the control means.

22. A four-wheel steering system as defined in claim 21 in which said control means is connected with the relay shaft by way of a universal joint.

23. A four-wheel steering system as defined in claim 21 which said control means comprises and input shaft connected to the relay shaft and said locking means is adapted to prevent displacement of the input shaft.

24. A four-wheel steering system as defined in claim 23 in which the locking means comprises a bolt which is adapted to be screwed into a bolt hole to be engaged with the input shaft.

25. A four-wheel steering system comprising a front wheel turning mechanism for turning front wheels in response to operation of a steering wheel, a rear wheel turning mechanism for turning rear wheels in response to turning of the front wheels, and a relay shaft which transmits the amount of turning of the front wheels to the rear wheel turning mechanism, characterized in that the rear wheel turning mechanism comprises a rear wheel turning rod which extends in the transverse direction of the vehicle body and is movable in the direction of the vehicle body to turn the rear wheels respectively connected to the left and right ends thereof by way of wheel supports, a control means which controls the rear wheel turning rod according to the amount of turning of the front wheels transmitted thereto through an input shaft connected to the relay shaft by way of a connecting means, and a locking means which is adapted to prevent displacement of the input shaft, the locking means comprising a bolt which is adapted to be screwed into a bolt hole to be engaged with the input shaft.

26. A method of incorporating in a vehicle a four-wheel steering system having a front wheel turning mechanism for turning front wheels in response to operation of a steering wheel, a rear wheel turning mechanism for turning rear wheels in response to turning of the front wheels according to preset four-wheel steering characteristics, and a relay shaft which transmits the amount of turning of the front wheels to the rear wheel turning mechanism, the rear wheel turning mechanism including a rear wheel turning rod which extends in the transverse direction of the vehicle body and is movable in the direction of the vehicle body to turn the rear wheels respectively connected to the left and right ends thereof by way of wheel supports, a control means which controls the rear wheel turning rod according to the amount of turning of the front wheels transmitted thereto through an input shaft connected to the relay shaft by way of a connecting means, and a locking means which is adapted to prevent displacement of the input shaft, comprising the steps of effecting adjustment of the front wheels and the rear wheels while the input shaft is disconnected from the relay shaft and locked by the locking means, subsequently connecting the input shaft with the relay shaft by way of the connecting means, releasing the lock of the input shaft by the locking means, driving the rear wheel turning rod by a hydraulic actuator of said control means, and controlling the hydraulic actuator according to the displacement of the input shaft using a controller.

27. A method of incorporating in a vehicle a four-wheel steering system having a front wheel turning mechanism for turning front wheels in response to operation of a steering wheel, a rear wheel turning mechanism for turning rear wheels, a control means for controlling the rear wheel turning mechanism to turn the rear wheels according to preset four-wheel steering characteristics and a connecting means which is connected to the control means to transmit front wheel turning information to the control means, thereby operatively connecting the front wheel turning mechanism with the rear wheel turning mechanism, comprising the steps of causing the front wheel turning mechanism and the rear wheel turning mechanism to bring the front wheels and the rear wheels to respective reference positions and bringing the control means into a reference state while the connecting means is operatively disconnected from the control means, and connecting the connecting means to the control means, the reference position of the front wheels and the reference position of the rear wheels corresponding to each other on the basis of the preset four-wheel steering characteristics, the reference state of the control means being a state corresponding to the reference positions of the front and rear wheels on the basis of the preset four-wheel steering characteristics.

28. A method as defined in claim 27 further comprising a step of adjusting toe-in of the front and rear wheels after the connecting means is connected to the control means.

29. A method as defined in claim 28 further comprising the steps of temporarily locking the control means to the reference state before connecting the connecting means to the control means, and releasing the control means after connecting the connecting means to the control means.

30. A method as defined in claim 27 further comprising a step adjusting toe-in of the front and rear wheels after the steps of causing the front wheel turning mechanism and the rear wheel turning mechanism to bring the front wheels and the rear wheels to the respective reference positions and bringing the control means into a reference state, and before the step of connecting the connecting means to the control means.

31. A method as defined in claim 30 further comprising the steps of temporarily locking the control means to the reference state before the step of adjusting toe-in of the front and rear wheels and releasing the control means after the step of connecting the connecting means to the control means.

* * * * *